US010630153B2

(12) United States Patent
Hasuo et al.

(10) Patent No.: US 10,630,153 B2
(45) Date of Patent: Apr. 21, 2020

(54) LAMINATED CORE AND METHOD FOR MANUFACTURING SAME

(71) Applicant: MITSUI HIGH-TEC, INC., Kitakyushi-shi, Fukuoka (JP)

(72) Inventors: Yusuke Hasuo, Fukuoka (JP); Masahiro Izumi, Fukuoka (JP)

(73) Assignee: MITSUI HIGH-TEC, INC., Fukuoka (JP)

( * ) Notice: Subject to any disclaimer, the term of this patent is extended or adjusted under 35 U.S.C. 154(b) by 244 days.

(21) Appl. No.: 15/525,662

(22) PCT Filed: Nov. 10, 2015

(86) PCT No.: PCT/JP2015/081631
§ 371 (c)(1),
(2) Date: May 10, 2017

(87) PCT Pub. No.: WO2016/076321
PCT Pub. Date: May 19, 2016

(65) Prior Publication Data
US 2018/0358871 A1    Dec. 13, 2018

(30) Foreign Application Priority Data

Nov. 14, 2014 (JP) ................................ 2014-231647
Oct. 14, 2015 (JP) ................................ 2015-202570

(51) Int. Cl.
*H02K 1/06* (2006.01)
*H02K 15/02* (2006.01)
(Continued)

(52) U.S. Cl.
CPC .............. *H02K 15/02* (2013.01); *H02K 1/06* (2013.01); *H02K 1/146* (2013.01); *H02K 15/022* (2013.01); *H02K 15/12* (2013.01)

(58) Field of Classification Search
CPC .. H02K 1/00; H02K 1/06; H02K 1/12; H02K 1/14; H02K 1/146; H02K 1/148;
(Continued)

(56) References Cited

U.S. PATENT DOCUMENTS

| 2004/0124734 A1* | 7/2004 | Liao ....................... H02K 1/148 |
| | | 310/254.1 |
| 2004/0169433 A1* | 9/2004 | Park ....................... H02K 1/148 |
| | | 310/216.028 |

(Continued)

FOREIGN PATENT DOCUMENTS

| CN | 101523696 | 9/2009 |
| CN | 201549939 | 8/2010 |

(Continued)

OTHER PUBLICATIONS

Office Action issued in China Counterpart Patent Appl. No. 201580061773.3, dated Sep. 25, 2018 , along with an English translation thereof.

(Continued)

*Primary Examiner* — Tran N Nguyen
(74) *Attorney, Agent, or Firm* — Greenblum & Bernstein, P.L.C.

(57) ABSTRACT

A laminated iron core is made of a stator iron core formed by laminating a plurality of iron core pieces with a predetermined shape, and a caulking block detachable along a radial direction is formed in each of the iron core pieces. In a method for manufacturing the laminated iron core, the caulking block detachable along the radial direction is provided in each of the iron core pieces, and the iron core pieces are laminated and joined through the caulking blocks and are arranged on a jig and then, the caulking blocks are
(Continued)

pulled in the radial direction and are detached from the laminated iron core pieces, and the laminated iron core pieces are joined by a resin.

19 Claims, 16 Drawing Sheets

(51) Int. Cl.
  *H02K 1/14* (2006.01)
  *H02K 15/12* (2006.01)
(58) Field of Classification Search
  CPC ............ H02K 1/16; H02K 1/18; H02K 15/00; H02K 15/02; H02K 15/022; H02K 15/024; H02K 15/12; H02K 15/22
  See application file for complete search history.

(56) References Cited

U.S. PATENT DOCUMENTS

| | | | |
|---|---|---|---|
| 2006/0028087 A1* | 2/2006 | Ionel | H02K 1/148 310/216.086 |
| 2009/0026873 A1 | 1/2009 | Matsuo et al. | |
| 2010/0043202 A1* | 2/2010 | Tosu | B21D 35/00 29/593 |
| 2013/0249346 A1 | 9/2013 | Nagai et al. | |
| 2013/0293060 A1 | 11/2013 | Hasuo | |
| 2014/0111884 A1 | 4/2014 | Showa et al. | |

FOREIGN PATENT DOCUMENTS

| | | | |
|---|---|---|---|
| CN | 102132366 | | 7/2011 |
| CN | 203119637 | | 8/2013 |
| CN | 103595157 | | 2/2014 |
| JP | 11308821 | * | 11/1999 |
| JP | 2007-336608 | | 12/2007 |
| JP | 2012-165494 | | 8/2012 |
| JP | 2012-170222 | | 9/2012 |
| JP | 2013-59262 | | 3/2013 |
| JP | 5357187 | | 9/2013 |
| JP | 2014-87108 | | 5/2014 |
| WO | WO-2010082465 A1 * | 7/2010 | ......... H01F 41/0233 |

OTHER PUBLICATIONS

Search Report issued in Japan Patent Application No. PCT/JP2015/081631, dated Jan. 26, 2016.

English translation of Written Opinion of the International Searching Authority issued in Japan Patent Application No. PCT/JP2015/081631, dated Jan. 26, 2016.

Office Action issued in China Counterpart Patent Appl. No. 201580061773.3, dated May 22, 2019, along with an English translation thereof.

* cited by examiner

LAMINATED CORE AND METHOD FOR MANUFACTURING SAME

TECHNICAL FIELD

The present invention relates to a laminated iron core formed by mutually coupling iron core pieces adjacent in a lamination direction using a caulking block formed on each of the iron core pieces, and a method for manufacturing the laminated iron core.

BACKGROUND ART

In manufacture of a laminated iron core (motor core), generally, iron core pieces adjacent in a lamination direction are interlocked using caulking from the standpoint of cost and ease of manufacture. However, in the case of prioritizing, for example, efficiency or torque of a motor, a method for preventing a caulking shape from being left on the laminated iron core by mutually coupling the iron core pieces adjacent in the lamination direction using an adhesive or a resin is adopted. For example, Patent Literature 1 discloses a method in which an outer peripheral part of each iron core piece (core part) 120 is provided with a wing caulking block (scrap part) 121 and the iron core pieces 120 adjacent in a lamination direction are mutually caulked and bonded and integrated by this caulking block 121 and then the caulking block 121 is detached from the iron core pieces 120 as shown in FIG. 14.

CITATION LIST

Patent Literature

Patent Literature 1 Japanese Patent No. 5357187

SUMMARY OF INVENTION

Technical Problem

However, in the wing caulking block 121, one wing-shaped part 122 is fitted and fixed to fitting recesses 123 formed in the iron core pieces 120, with the result that it is necessary to detach the caulking block 121 from the iron core pieces 120 by sliding the caulking block 121 in the lamination direction of the iron core pieces 120. Because of this, a detachment mechanism becomes complicated and time is also required, with the result that a manufacturing cost is increased. Also, at the time of sliding the caulking block 121, a region of contact with the caulking block 121 is peeled in a slide direction, and a defective product occurs to increase the manufacturing cost. Particularly this phenomenon occurs in the iron core pieces of the end in the lamination direction and also, a rate of occurrence becomes higher as the plate thickness of the iron core piece becomes thinner. In addition, in Patent Literature 1, a region of contact between the caulking block 121 and the iron core piece 120 is formed with a plurality of recesses 124 to 126 for release in order for ease detachment of the caulking block 121 from the iron core pieces 120. However, in this case, a step of blanking the iron core piece becomes complicated and, for example, the number of working steps is increased, with the result that it is necessary to upsize a die unit and the manufacturing cost is increased.

The present invention has been implemented in view of such circumstances, and an object of the present invention is to provide a laminated iron core capable of being manufactured economically with good workability even using an iron core piece provided with a caulking block, and a method for manufacturing the laminated iron core.

Solution to Problem

A laminated iron core according to a first aspect of the present invention in line with the above object is a laminated iron core including a rotor iron core or a stator iron core in which a plurality of iron core pieces having a predetermined shape are laminated, the laminated iron core including: a caulking block detachable along a radial direction formed in any one or both of a radial inside region and a radial outside region of each of the iron core pieces.

In the laminated iron core according to the first aspect of the present invention, it is preferable that the caulking block includes: a caulking part projected from the iron core piece and formed with a caulking projection; and a joining part engaged with a fitting part of the iron core piece. Here, the joining part can be temporarily fixed to the fitting part by push back processing. The push back processing means that the joining part is once completely separated (cut and bent) from of the iron core piece and then this separated joining part is again pushed back (hit) to the iron core piece side to be formed in a planar shape (the joining part pushed back is leveled with the fitting part of the periphery of the joining part), or the joining part is half blanked from of the iron core piece and then this half blanked joining part is again pushed back (hit) to the iron core piece side to be formed in a plane shape (the joining part pushed back is leveled with the iron core piece of the periphery of the joining part).

Preferably, the joining part has an isosceles trapezoidal shape narrowing in a pullout direction, and a radial length of the joining part is 0.5 to 2 mm, and a distal lower side of the joining part becomes wider than an upper side of the joining part in a range up to 0.2 mm or less. Preferably, the joining part has an isosceles trapezoidal shape widening in a pullout direction, and a radial length of the joining part is 0.5 to 2 mm, and a distal lower side of the joining part becomes narrower than an upper side of the joining part in a range up to 4 mm or less.

The laminated iron core according to the first aspect of the present invention, it is preferable that outer shape lines of the iron core piece in both sides of the caulking block are joined to a final blanking outer shape line of the iron core piece so as to have steps therebetween.

A method for manufacturing a laminated iron core according to a second aspect of the present invention in line with the above object is a method for manufacturing a laminated iron core by laminating a plurality of iron core pieces having a predetermined shape to form a rotor iron core or a stator iron core, the method including: providing a caulking block detachable along a radial direction formed in any one or both of a radial inside region and a radial outside region of each of the iron core pieces; laminating and joining the iron core pieces through the caulking blocks; arranging the laminated iron core pieces on a jig; then pulling the caulking blocks in the radial direction to detach the caulking blocks from the laminated iron core pieces; and joining the laminated iron core pieces by any one or more of a resin, an adhesive and welding.

In the method for manufacturing the laminated iron core according to the second aspect of the present invention, it is preferable that the caulking block includes a caulking part formed with a caulking projection, and a joining part engaged with a fitting part of the iron core piece, and the joining part is fitted into the fitting part by push back processing by which the joining part is cut and bent or is half blanked and then is hit to be formed in a planar shape.

Preferably, the joining part has an isosceles trapezoidal shape narrowing in a pullout direction, and an angle of the oblique side is set at $\tan^{-1} 0.1$ or less. Preferably, the joining part has an isosceles trapezoidal shape widening in a pullout direction, and an angle of the oblique side is set at $\tan^{-1} 2$ or less.

A method for manufacturing a laminated iron core according to a third aspect of the present invention in line with the above object is a method for manufacturing a laminated iron core, in which a plurality of iron core pieces are caulked and laminated by a caulking block formed in any one or both of a radial inside region and a radial outside region of the iron core pieces, and the caulking blocks are detached from the laminated iron core pieces and then the laminated iron core pieces are fixed, the method including: a first step of blanking first and second side regions in the region of the iron core piece, wherein the first and second side regions include outer shape lines of the iron core piece and form both lateral sides of the caulking block; a second step of forming a center of the first and second side regions with a caulking projection; a third step of forming a joining part, by which the caulking block is connected to the iron core piece, by push back processing and separably joining the caulking block to the iron core piece; a fourth step of blanking and forming the iron core piece with the caulking block provided, and caulking and laminating the iron core pieces with the caulking blocks; a fifth step of arranging the laminated iron core pieces on a jig and then pulling the caulking blocks in a radial direction to detach the caulking blocks from the laminated iron core pieces; and a sixth step of fixing the laminated iron core pieces.

In the method for manufacturing the laminated iron core according to the third aspect of the present invention, it is preferable that before the iron core piece with the caulking block provided is blanked and formed, a previous blanking part is formed in the radial outside region from a caulking part formed with the caulking projection.

A method for manufacturing a laminated iron core according to a fourth aspect of the present invention in line with the above object is a method for manufacturing a laminated iron core made of a rotor iron core, in which an iron core piece with a shaft hole formed in a center and provided with a bridge piece part astride the shaft hole is formed and a caulking block is fabricated in a radial outside region of the bridge piece part and the iron core pieces are caulked and laminated and the caulking blocks are detached from the laminated iron core pieces and then the laminated iron core pieces are fixed, the method including: a first step of blanking first and second side regions in the radial outside region of the bridge piece part, wherein the first and second side regions include shaft hole outer shape lines of the iron core piece and form both lateral sides of the caulking block; a second step of forming a caulking projection between the first and second side regions; a third step of forming a joining part, by which the caulking block is connected to the iron core piece, by push back processing and separably joining the caulking block to the iron core piece; a fourth step of blanking and removing a radial inside region of the bridge piece part and then blanking and forming an outer shape of the iron core piece and caulking and laminating the iron core pieces with the caulking blocks; a fifth step of pulling the caulking blocks to a radial inside and detaching the caulking blocks from the laminated iron core pieces; and a sixth step of fixing the laminated iron core pieces.

A method for manufacturing a laminated iron core according to a fifth aspect of the present invention in line with the above object is a method for manufacturing a laminated iron core, wherein iron core pieces formed with shaft holes in centers are caulked and laminated by a plurality of caulking blocks separably formed in radial inside regions of the shaft holes, and the iron core pieces are placed on a jig, and the caulking blocks are pulled to a radial inside and are detached from the laminated iron core pieces and then, the laminated iron core pieces are fixed.

In the method for manufacturing the laminated iron core according to the fifth aspect of the present invention can include: a first step of forming a caulking hole in a region formed with the caulking block of a strip material forming the iron core piece located in a lowermost part and forming caulking projections in regions formed with the caulking blocks of the strip materials forming the second to uppermost iron core pieces; a second step of leaving the regions formed with the caulking blocks in the strip materials and forming the shaft hole; a third step of forming a joining part, by which the caulking block is connected to the iron core piece, by push back processing and separably joining the caulking block to the iron core piece; and a fourth step of caulking and laminating the iron core pieces and placing the iron core pieces on the jig and pulling the caulking blocks to the radial inside and detaching the caulking blocks from the laminated iron core pieces.

In the laminated iron core described above, a surface radially extending in the caulking block may be provided with a hooking part having a recessed shape in which the jig can enter in the case of pulling out.

In the laminated iron core described above, the caulking block may have the caulking part for caulking the laminated iron core pieces, and the caulking part may have the caulking projection which has a flat shape having a short axis and a long axis longer than the short axis and the long axis extends along a pullout direction.

In each of the manufacturing methods described above, in the case of forming the caulking part used as the caulking block, a side radially extending in the caulking block may be formed with a hooking part having a recessed shape in which the jig can enter in the case of pulling out.

In the manufacturing methods described above, in the case of forming the caulking part used as the caulking block, the caulking part may be formed with the caulking projection which has a flat shape having a short axis and a long axis longer than the short axis and the long axis extends along a pullout direction.

In each of the manufacturing methods described above, in the case of the push back processing, a root site of the side of the iron core piece in the caulking part constructing the caulking block is preferably formed with shoulder parts having sides extending in the radial direction and sides extending in the circumferential direction.

In the laminated iron core described above, the iron core piece may have a plurality of fitting parts respectively fitted with the joining parts of the plurality of caulking blocks, and at least one of the plurality of fitting parts may have a shape different from that of the other fitting parts.

Advantageous Effects of Invention

In the laminated iron core according to the first aspect of the present invention and the methods for manufacturing the laminated iron cores according to the second and third aspects of the present inventions, the caulking block detachable along the radial direction is formed in the radial inside region and/or the radial outside region of each of the iron core pieces, with the result that a mechanism for detaching the caulking block can be made simpler and also time necessary for detachment can be made shorter than ever before. Accordingly, a manufacturing cost can be reduced. Also, since there is no fear that a region of contact with the caulking block is peeled in a slide direction like the conventional art, it is unnecessary to increase a blanking step of preventing this peeling and also, a defective product caused by this peeling can be prevented, with the result that the manufacturing cost can be reduced. Consequently, the laminated iron core capable of being manufactured economically with good workability even using the iron core piece provided with the caulking block, and the method for manufacturing the laminated iron core can be provided.

Particularly, in the method for manufacturing the laminated iron core according to the second aspect of the present invention, the laminated iron core pieces are arranged on the jig and then, the caulking blocks are pulled in the radial direction and are detached, and the laminated iron core pieces are joined (fixed) by any one or more of the resin, the adhesive and the welding, with the result that the laminated iron core pieces can be integrated in a state in which a stress caused by the caulking blocks is removed from the laminated iron core pieces and in a state in which the laminated iron core pieces are aligned and arranged along the jig. Consequently, shape accuracy of the laminated iron core can be improved, with the result that the laminated iron core with high quality can be provided.

In the methods for manufacturing the laminated iron cores according to the fourth and fifth aspects of the present inventions, the caulking blocks are formed inside the shaft hole formed in the center of the rotor iron core, with the result that even in the case of performing operation of pulling the caulking blocks and detaching the caulking blocks from the laminated iron core pieces or blanking processing for formation of the caulking blocks, deformation and a decrease in shape accuracy of the outer peripheral side of the iron core piece can be prevented, and the rotor iron core with high accuracy can be manufactured.

DESCRIPTION OF EMBODIMENT

Figure 1:
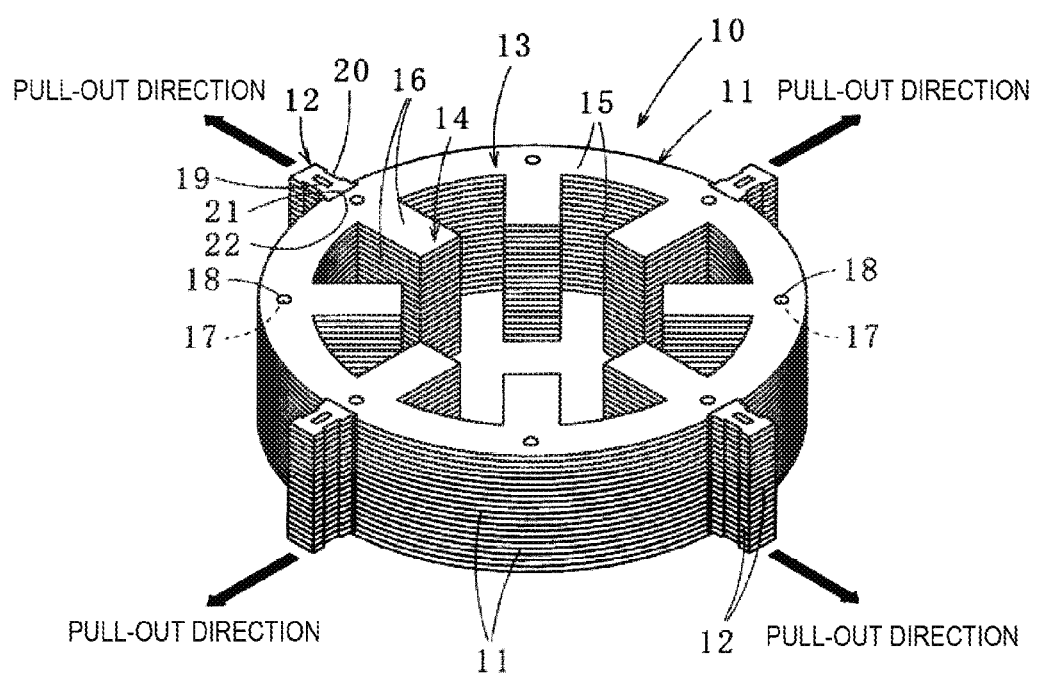
FIG. 1 is a perspective view of a laminated iron core according to a first embodiment of the present invention.

Subsequently, embodiments embodying the present invention will be described with reference to the accompanying drawings, and the present invention will be understood. As shown in FIGS. 1 and 2(A), a laminated iron core 10 according to a first embodiment of the present invention is a stator iron core (stator), and a caulking block 12 detachable along a radial direction (a direction orthogonal to a lamination direction and herein, a horizontal (transverse) direction) is formed in a radial outside region of a plurality of laminated iron core pieces 11 with predetermined shapes blanked from a strip material. In addition, the laminated iron core 10 used as a product body has an annular yoke part 13 and a plurality of magnetic pole parts 14 formed inside the yoke part 13, and the yoke part 13 is formed by annular yoke piece parts 15 of the plurality of laminated iron core pieces 11 and also, the magnetic pole parts 14 are formed by magnetic pole piece parts 16 of the plurality of laminated iron core pieces 11, respectively. Hereinafter, description will be made in detail.

The iron core piece 11 constructing the laminated iron core 10 has an annular integral structure. In addition, the iron core piece may have a divided structure capable of annularly joining a plurality of circularly arcuate iron core piece parts, or a structure capable of connecting a part of the plurality of circularly arcuate iron core piece parts in a circumferential direction by a joining part and folding this joining part to be formed in an annular shape. This iron core piece 11 is blanked and formed from a strip material made of, for example, an amorphous material or an electromagnetic steel plate with a thickness of about 0.10 to 0.5 mm. Also, the iron core piece 11 is blanked and formed from one strip material, but may be a piece blanked from a plurality of (for example, two, or three or more) stacked strip materials.

The iron core pieces 11 adjacent in the lamination direction are mutually joined by filling a through hole (coupling part) 17 communicated and formed in the yoke part 13 in the lamination direction with a resin (a thermosetting resin (for example, an epoxy resin) or a thermoplastic resin) 18, but the iron core pieces 11 can also be joined on the radial inside or the radial outside of the laminated iron core by filling a recess (coupling part) communicated and formed in the lamination direction with the resin. In addition, two or more of these can be combined. The plurality of through holes 17 are formed at equal pitches in a circumferential direction of the laminated iron core 10. Also, in the case of mutually joining the iron core pieces, an adhesive or welding other than the resin described above can be used and further, any two or more of the resin, the adhesive and the welding can be used in combination.

In the radial outside region of each of the iron core pieces 11, that is, the radial outside region of the yoke piece parts 15, the plurality of (four herein) caulking blocks 12 are formed at equal pitches in the circumferential direction. In addition, for convenience of description, FIG. 1 shows the caulking blocks 12 in a state attached to the laminated iron core 10, but the caulking blocks 12 are detached before the iron core pieces 11 are mutually joined as described below. This caulking block 12 has a caulking part 20 formed with a caulking projection 19. Here, the caulking part 20 has, for example, a rectangular shape in plan view and is projected from the iron core piece 11 (yoke piece part 15), and both sides in a width direction (a direction orthogonal to a pullout direction) are provided with hooking parts 20a for hooking a pullout jig along the pullout direction.

Figure 3:
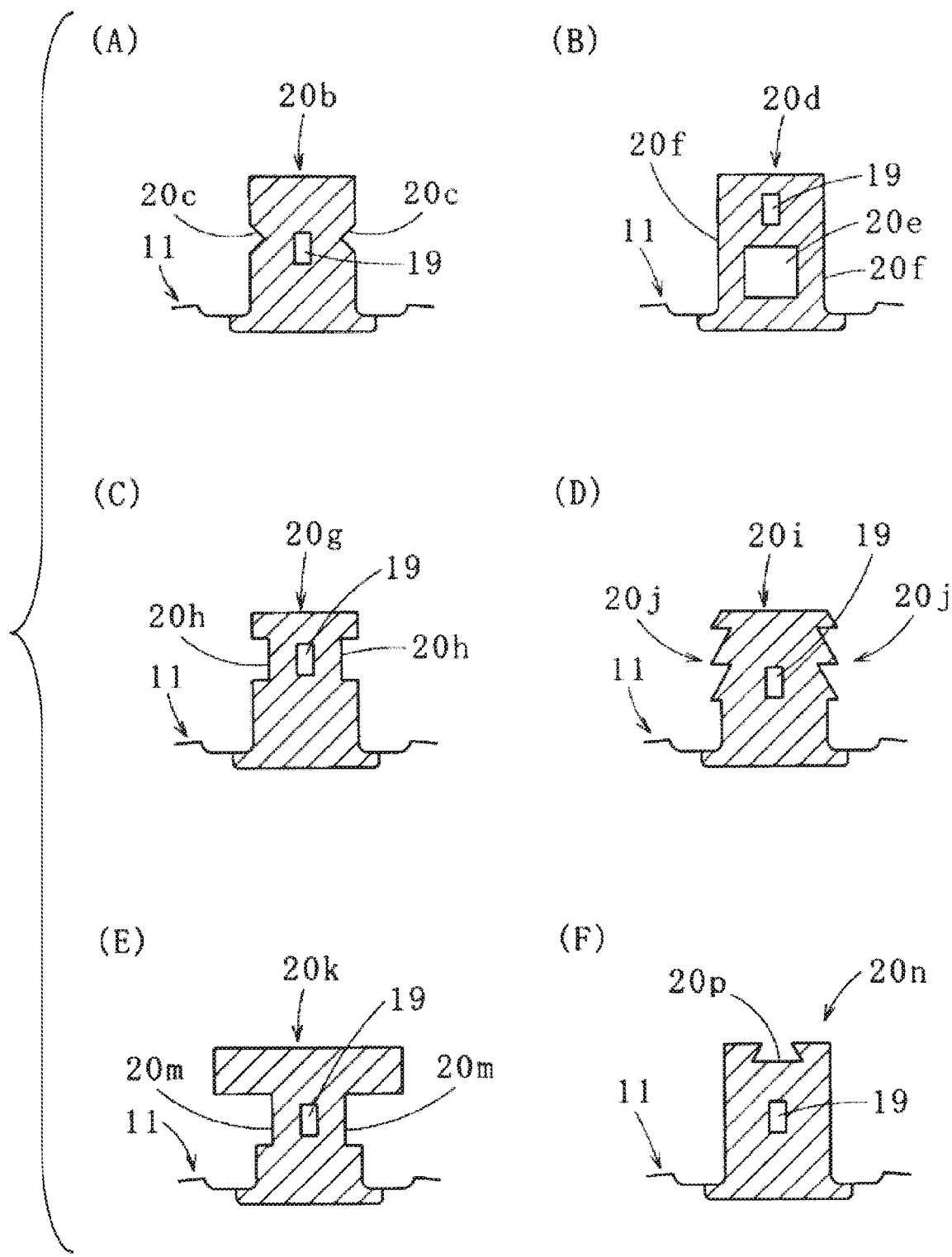
FIG. 3 includes (A) to (F) plan views of caulking parts according to modified examples.

In addition, the caulking part is means for facilitating detachment of the caulking block from the iron core pieces, and as long as this requirement can be satisfied, the shape of the caulking part is not particularly limited. For example, as shown in FIG. 3(A), a caulking part 20b can be provided with a hooking part 20c having a shape different from that of the hooking part 20a, or as shown in FIG. 3(B), the center of a caulking part 20d can be formed with a hole 20e and deformability of a hooking part 20f is increased to be made resistant to coming out in the case of being gripped, or as shown in FIG. 3(C), a caulking part 20g can be provided with a hooking part 20h having a position different from that of the hooking part 20a, or as shown in FIG. 3(D), both sides of a caulking part 20i can be provided with multistep-shaped hooking parts 20j in order to surely transmit a pullout force, or as shown in FIG. 3(E), a caulking part 20k can be formed in a T shape in plan view and a hooking part 20m having a shape different from that of the hooking part 20a can be formed, or as shown in FIG. 3(F), the distal end of a caulking part 20n can be provided with a hooking part 20p having an isosceles trapezoidal shape narrowing in the pullout direction.

Thus, the caulking part 20 is preferably provided with the hooking part. As shown in FIGS. 2(A) to 2(C) and 3(A) to 3(F), the hooking part is preferably formed on the outside diameter side from a final blanking outside diameter line 25 of the iron core piece 11. The hooking part is preferably formed in a position separated from the final blanking outside diameter line 25 of the iron core piece 11 to the outside diameter side. The end of the inside diameter side of the hooking part is preferably separated from the final blanking outside diameter line 25 to the outside diameter side.

In the case of detaching the caulking block as described below, a jig is hooked in the hooking part and the caulking block is pulled by the jig. When the hooking part is positioned from the final blanking outside diameter line 25 to the outside diameter side, the tip of the jig is resistant to damaging an outer peripheral surface of the iron core piece 11 in the case of hooking the jig in the hooking part.

When the iron core pieces 11 including the caulking parts 20 provided with the hooking parts are laminated in this manner, a surface radially extending in the caulking block 12 is provided with a recess having a recessed shape in which the jig can enter in the case of pulling out the caulking block 12.

Figure 2:
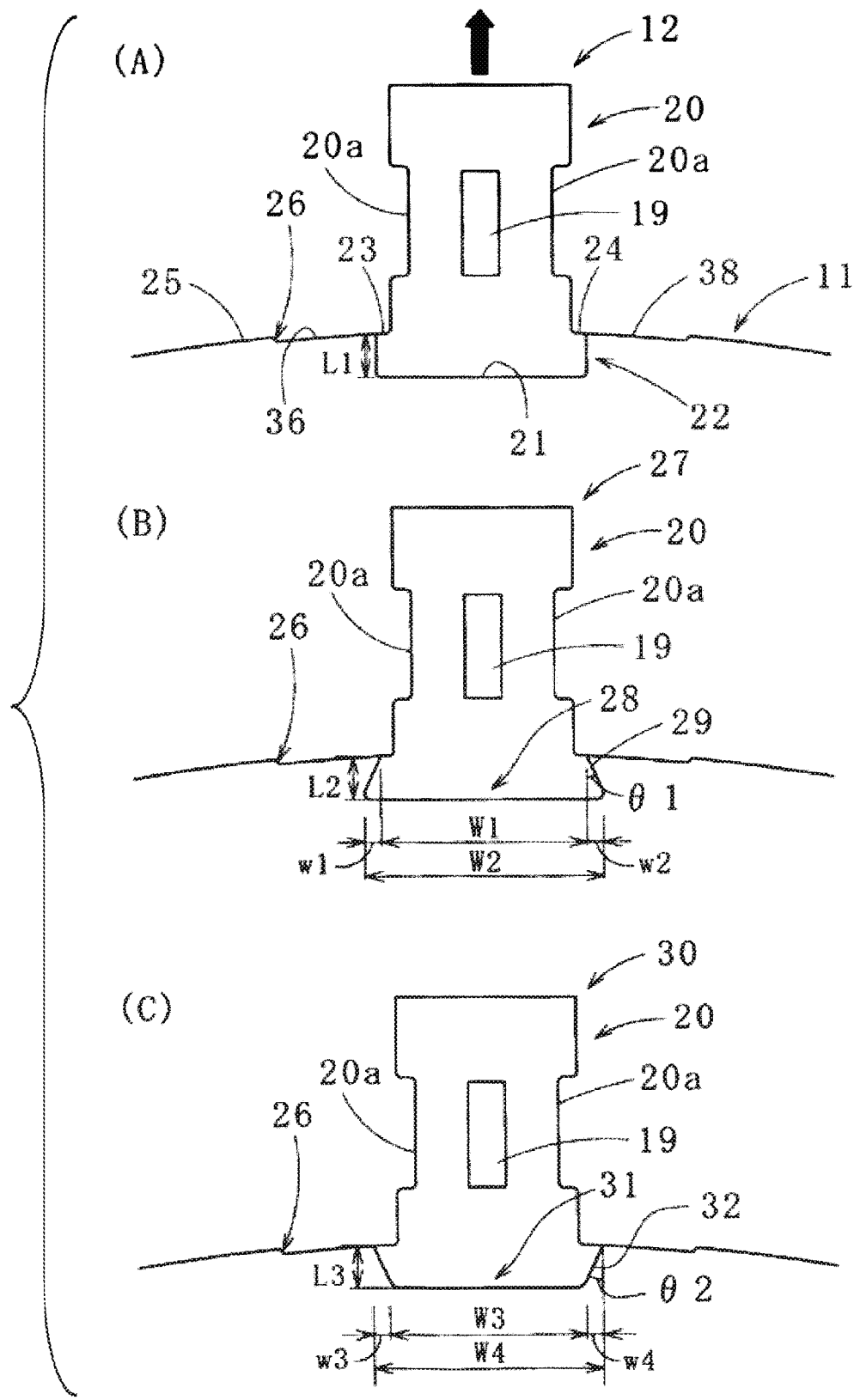
FIG. 2 includes (A) a plan view of a caulking block formed on an iron core piece constructing the laminated iron core, and (B) and (C) plan views of caulking blocks according to first and second modified examples, respectively.

As shown in FIG. 2, both sides of the caulking part 20 with the rectangular shape in plan view in the width direction are preferably provided with the hooking parts 20a as the recessed shapes recessed in the circumferential direction. That is, a side extending in the pullout direction of the caulking part 20 has a step part lower than the outside diameter side and the inside diameter side in the radial center. Since an opening of the hooking part with the recessed shape can be formed largely, the jig tends to enter the hooking parts 20a and tends to be hooked in the hooking parts 20a.

The caulking projection 19 formed in a center position of the caulking part 20 is formed by, for example, half blanking caulking or V caulking. In addition, the caulking part of the caulking block formed on the iron core piece with the first order of lamination is formed with a caulking hole (through hole) into which the caulking projection 19 is fitted. As long as the plurality of iron core pieces 11 can be integrated without displacing a relative position of the mutual iron core pieces 11 adjacent in the lamination direction, the size of this caulking projection 19 is not particularly limited and can variously be changed depending on specifications (for example, outer shape dimensions of the iron core piece, the number of laminated iron core pieces, and the weight of the iron core piece) of the laminated iron core. In addition, in the case of the V caulking, the caulking projection in which the size of one side is about 0.5 to 5 mm (for example, 1 mm by 4 mm) and the depth of caulking is the thickness of the iron core piece and is about 0.5 to 2 sheets of the iron core piece (for example, one sheet of the iron core piece) can be used.

As shown in the drawings, the caulking projection 19 is formed in substantially a rectangular shape. The caulking projection 19 has a short side extending in a circumferential direction, and a long side extending in a radial direction. Thus, the long axis of the caulking projection 19 extends in a pullout direction. Since the strength of the caulking projection 19 in the pullout direction is high, the caulked place is resistant to coming out in the case of pulling out the caulking block 12. In addition, the caulking projection 19 is not limited to the rectangular shape, and may have a flat shape such as an elliptical shape. Preferably, the caulking projection has the flat shape having the short axis and the long axis longer than the short axis, and the long axis extends along the pullout direction.

Also, the caulking block 12 has a joining part 22 engaged with a fitting part 21 opened toward the radial outside of the yoke piece part 15. The joining part 22 has a quadrilateral shape (sides located in both sides in the circumferential direction are parallel) in plan view, and is continuously formed (connected) on the radial inside of the caulking part 20, and is temporarily fixed to the fitting part 21 by, for example, push back processing. Concretely, after the joining part 22 is once completely separated (cut and bent) or is half blanked from the yoke piece part 15 of the iron core piece 11, this joining part 22 separated or half blanked is again pushed back (hit) to be formed in a plane shape, and the joining part 22 is leveled with the yoke piece part 15 of the periphery of the joining part 22.

In this joining part 22, the width of the portion connected to the caulking part 20 is wider than the width of the caulking part 20 by the amount corresponding to the lengths of shoulder parts 23, 24 forming the joining part 22. In addition, outer shape lines 36, 38 of the iron core piece 11 (located in both sides of the caulking block 12) respectively continuous with the shoulder parts 23, 24 forming the joining part 22 are joined to the final blanking outer shape line 25 of the iron core piece 11 in a state having steps 26, but it is unnecessary to have the steps. The size of this joining part 22 can variously be changed depending on specifications (for example, outer shape dimensions of the iron core piece, the number of laminated iron core pieces, and the weight of the iron core piece) of the laminated iron core and, for example, a radial length L1 of the joining part 22 is about 0.5 to 2 mm (further, an upper limit is 1.5 mm).

In addition, as shown by numerals 23, 24 in FIG. 2(A), the caulking part 20 preferably has the shoulder parts. The shoulder parts 23, 24 are sites at which sides of the caulking part 20 extending in the radial direction are connected to the final blanking outer shape line 25 of the iron core piece 11. The shoulder parts 23, 24 are constructed of sides extending in the radial direction and sides extending along the steps 26 extending in the circumferential direction of the iron core piece 11. In addition, the shoulder parts 23, 24 include surfaces extending in the radial direction and surfaces extending in the circumferential direction when the plurality of iron core pieces 11 are laminated.

In addition, the caulking block can have configurations shown in FIGS. 2(B) and 2(C) as long as the caulking block has the configuration detachable along the radial direction. In a caulking block 27 shown in FIG. 2(B), a joining part 28 has an isosceles trapezoidal shape narrowing in the pullout direction, and a radial length L2 of the joining part 28 is 0.5 to 2 mm, and a distal (shaft center side) lower side W2 of the joining part 28 is made wider than a proximal (radial outside) upper side W1 of the joining part 28 in a range from 0 (exclusive) to 0.2 mm (inclusive) (preferably, 0.15 mm or less, for example, about 0.10 mm). In addition, here, projection widths w1, w2 of the distal lower side W2 with respect to the proximal upper side W1 projected to both sides of the joining part 28 are made equal (w1, w2 are respectively 0.1 mm or less, preferably, 0.075 mm or less, for example, about 0.05 mm). In this case, an inclination angle θ1 of an oblique side 29 with respect to the radial direction is preferably set at $\tan^{-1} 0.1$ or less (0° (exclusive) to 5.8° (inclusive), preferably, 4.3° or less, for example, about) 2.9°).

Also, in a caulking block 30 shown in FIG. 2(C), a joining part 31 has an isosceles trapezoidal shape widening in the pullout direction, and a radial length L3 of the joining part 31 is 0.5 to 2 mm, and a distal lower side W4 of the joining part 31 is made narrower than a proximal upper side W3 of the joining part 31 in a range from 0 (exclusive) to 4 mm (inclusive) (preferably, 3 mm or less). In addition, here, projection widths w3, w4 of the proximal upper side W3 with respect to the distal lower side W4 projected to both sides of the joining part 31 are made equal (w3, w4 are respectively 2 mm or less, preferably 1.5 mm or less). In this case, an inclination angle θ2 of an oblique side 32 with respect to the radial direction is preferably set at $\tan^{-1} 2$ or less (0° (exclusive) to 64° (inclusive), preferably 56° or less). In addition, in the caulking block 30 shown in FIG. 2(C), the distal side of the joining part 31 becomes narrower and has a shape easier to be detached from the fitting part as compared with the caulking block 12 shown in FIG. 2(A), with the result that a holding force (an engaging force of the caulking block 30 with respect to the fitting part) of the caulking block 30 in the laminated iron core tends to become weak. As a result, for example, a position of formation of the caulking projection in the caulking part is moved nearer to the joining part side than a position shown in FIG. 2(C) (a material of the caulking part is moved to the joining part side) and thereby, the extent of fitting the joining part into the fitting part can be increased to increase the holding force of the caulking block.

The radial lengths L1 to L3 of the joining parts 22, 28, 31, the projection widths (w1, w2) of the distal lower side W2 with respect to the proximal upper side W1 of the joining part 28 and the projection widths (w3, w4) of the proximal upper side W3 with respect to the distal lower side W4 of the joining part 31 are respectively set based on results obtained by various tests to consider whether or not the caulking block can be detached along the radial direction, and an effect of caulking of the laminated iron core by the caulking block.

Figure 4:
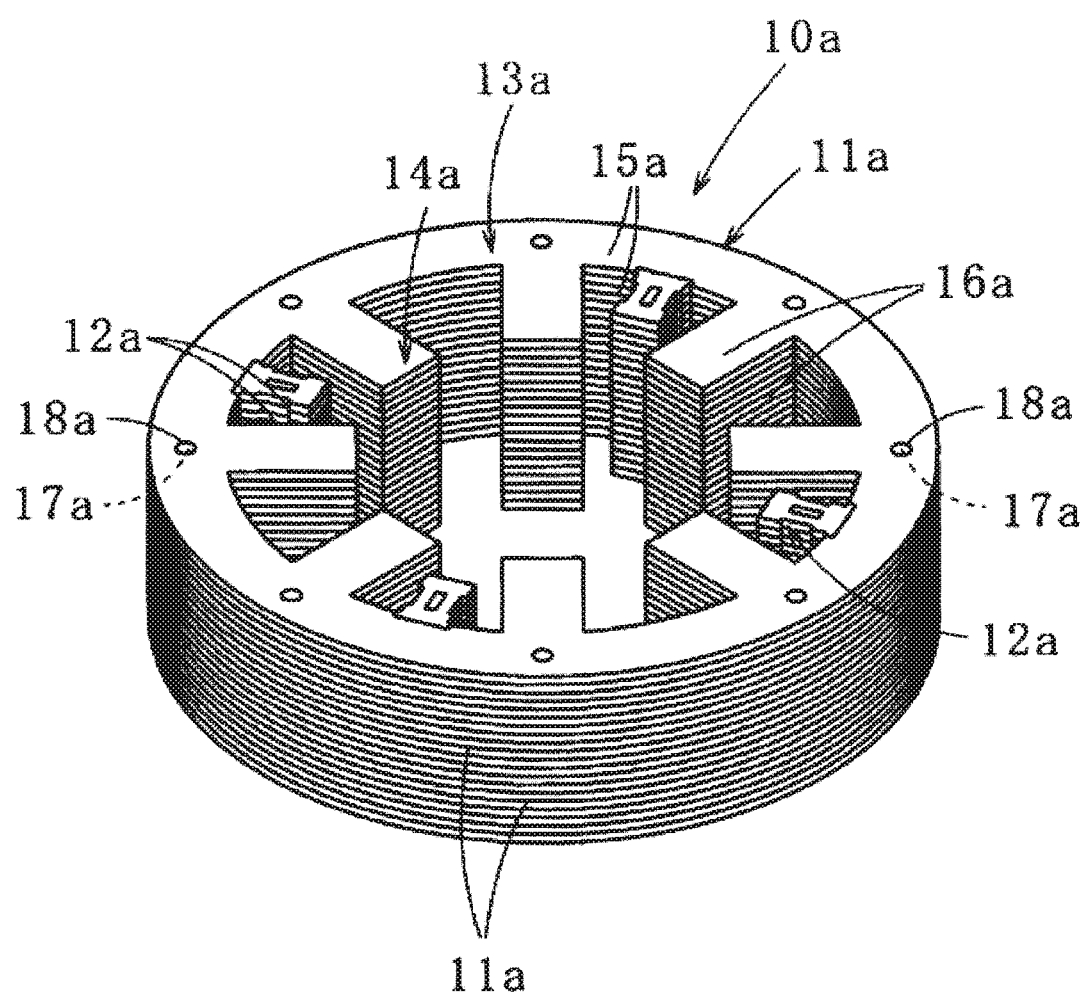
FIG. 4 is a perspective view of a laminated iron core according to a second embodiment of the present invention.

In addition, as a laminated iron core according to a second embodiment of the present invention, a radial inside region of a plurality of iron core pieces 11a, that is, the radial inside region (between adjacent magnetic pole piece parts 16a) of yoke piece parts 15a can be provided with a plurality of (four herein) caulking blocks at equal pitches in the circumferential direction as shown in FIG. 4. In this case, a pull direction of a caulking block 12a is set in the shaft center side of a laminated iron core 10a. Here, each member described in FIG. 4 has a configuration substantially similar to that of each member described in FIG. 1, with the result that detailed description is omitted by assigning "a" to the numeral of FIG. 1. Also, both of the radial inside region and the radial outside region of the iron core pieces can be provided with the plurality of caulking blocks, Subsequently, a method for manufacturing the laminated iron core according to the first embodiment of the present invention will be described.

The plurality of iron core pieces 11 are blanked from a strip material 33 made of, for example, an electromagnetic steel plate with a thickness of about 0.10 to 0.5 mm in order shown in FIGS. 5(A) to 5(E) using a die unit shown). In addition, in the caulking block slid in a conventional lamination direction (a vertical (longitudinal) direction herein), a rate of occurrence of peeling in a slide direction becomes higher as the thickness of the iron core piece becomes thinner, with the result that an effect of the present invention becomes more remarkable when the thickness of the strip material is 0.2 mm or less. This iron core piece 11 is blanked from the one strip material 33, but the plurality of iron core pieces may simultaneously be blanked from the plurality of (for example, two, or three or more) stacked strip materials.

Figure 5:
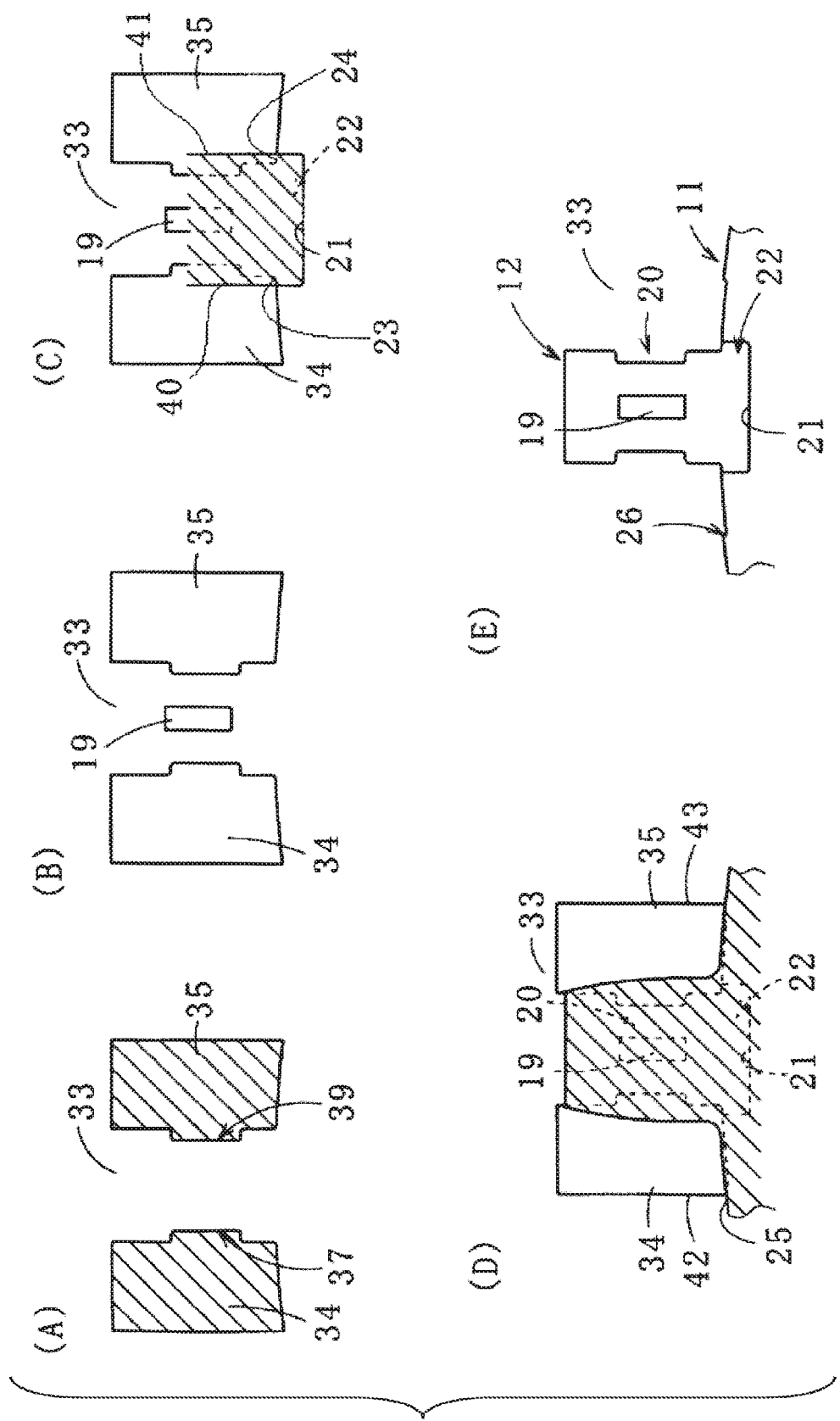
FIG. 5 includes (A) to (E) explanatory diagrams of a method for manufacturing the laminated iron core according to the first embodiment of the present invention.

First, as shown in FIG. 5(A), first and second side regions 34, 35 are blanked in a radial outside region of the iron core piece 11 intended to be blanked from the strip material 33. This first side region 34 includes one outer shape line 36 of the iron core piece 11 shown in FIG. 2(A) and forms one lateral side 37 (including the shoulder part 23) of the caulking block 12, and the second side region 35 includes the other outer shape line 38 of the iron core piece 11 shown in FIG. 2(A) and forms the other lateral side 39 (including the shoulder part 24) of the caulking block 12 (the above is a first step). In addition, in the case of forming the first and second side regions 34, 35, a hooking part having a recessed shape of a caulking part is preferably formed. That is, in the case of forming the caulking part used as the caulking block, a side radially extending in the caulking block is preferably formed with the hooking part having the recessed shape in which a jig can enter in the case of pulling out the caulking block. When the plurality of iron core pieces 11 are laminated, a surface radially extending in the caulking block 12 is formed with the hooking part having the recessed shape.

Next, as shown in FIG. 5(B), a center position of the first and second side regions 34, 35 in the strip material 33 from which the first and second side regions 34, 35 are blanked is formed with the caulking projection 19 formed by, for example, half blanking caulking or V caulking. In addition, the caulking part of the caulking block formed on the iron core piece with the first order of lamination is formed with a caulking hole (through hole) into which the caulking projection 19 is fitted (the above is a second step). In addition, the orders of the first step and the second step may be replaced.

In addition, in the case of forming the caulking part 20 used as the caulking block 12, the caulking part 20 is preferably formed with the caulking projection 19 with a flat shape having a short axis and a long axis longer than the short axis so that the long axis extends along the pullout direction.

As shown in FIG. 5(C), the joining part 22 by which the caulking block 12 intended to be blanked from the strip material 33 is connected to the iron core piece 11 is formed by the push back processing described above, and the caulking block 12 is separably joined to the iron core piece 11. In addition, the joining part 22 is formed so that radial outside portions of cut lines 40, 41 including both sides of the joining part 22 respectively overlap with the first and second side regions 34, 35. Accordingly, the shoulder parts 23, 24 are formed, and the caulking block 12 can surely be separated from the iron core piece 11 in a fifth step described below. Thus, before blanking and forming the iron core piece 11 in a state including the caulking block 12, the caulking part 20 is preferably formed with the shoulder parts 23, 24.

More concretely, as shown in FIG. 5(C), the caulking part 20 can be formed with the shoulder parts 23, 24 by performing the push back processing using a die unit having a dimension larger than a circumferential dimension of a root site of the side of the iron core piece 11 in the caulking part 20 in the case of forming the joining part 22. Thus, in the case of the push back processing, the root site of the side of the iron core piece 11 in the caulking part 20 constructing the caulking block 12 is desirably formed with the shoulder parts having sides extending in the radial direction and sides extending in the circumferential direction.

Also, here, the strength of fitting the joining part 22 into the fitting part 21 of the iron core piece 11 can be adjusted. This adjusting method includes a method for adjusting the overhanging amount of a material of the iron core piece located in both sides of the joining part to the side of the joining part by, for example, a kind, a size, a depth, a direction, a formation position of the caulking block, or a radial length of the joining part or an inclination angle of an oblique side of the joining part. Also, the adjusting method includes a method for increasing the overhanging amount of a material of the joining part to the side of the iron core piece by hitting the joining part (the above is a third step).

As shown in FIG. 5(D), the iron core piece 11 in a state including the caulking block 12 is blanked and formed and as shown in FIG. 5(E), the iron core pieces 11 with the caulking blocks 12 are caulked and laminated. At this time, the plurality of laminated iron core pieces 11 (the laminated iron core 10) are laminated and joined (temporarily bonded) by the joining parts 22 of the laminated caulking blocks 12. In addition, the iron core piece 11 is formed so that the final blanking outer shape line 25 of the iron core piece 11 shown in FIG. 2(A) intersects with blanking lines 42, 43 in both sides of the first and second side regions 34, 35 in a width direction. Accordingly, the caulking block 12 can surely be separated from the iron core piece 11 in the fifth step described below (the above is a fourth step).

Figure 6:
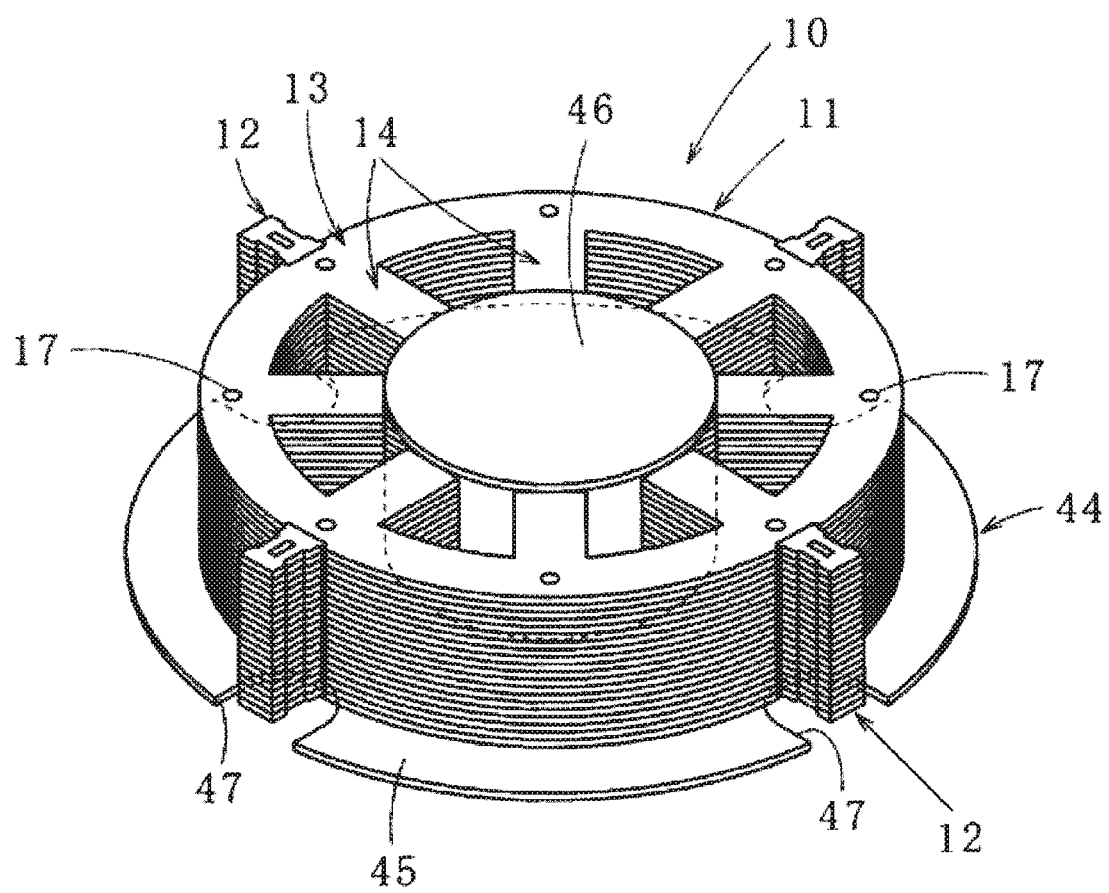
FIG. 6 is a perspective view showing a state in which the laminated iron core manufactured by using the method for manufacturing the laminated iron core is placed on a conveyance jig.

Then, the plurality of iron core pieces 11 laminated and joined by the joining parts 22 of the laminated caulking blocks 12 are placed on a conveyance jig (one example of the jig) 44 as shown in FIG. 6. The conveyance jig 44 has a placement table 45 with substantially a circular shape, and a core member (guide member) 46 formed in the center of the placement table 45. In this core member 46, the upper end is chamfered, but the other portion is formed in a circular cross section (may be formed in a polygonal cross section) and abuts on the inside ends of the magnetic pole parts 14. Accordingly, the shaft center of the laminated iron core pieces 11 can be positioned as shown in FIGS. 6 and 7.

In addition, a plurality of positioning members which are present between the adjacent magnetic pole parts 14 and abut on the magnetic pole parts 14 and stop rotation of the laminated iron core with respect to the placement table can be oppositely arranged on the placement table. The positioning members may be used instead of the core member, and can also be used in combination with the core member. Also, a position just under of the laminated caulking blocks 12 on the periphery of the placement table 45 is formed with a notch 47 useable in the case of mutually joining the plurality of laminated iron core pieces 11 after the caulking blocks 12 are detached as described below, but it is unnecessary to form the notch 47 depending on a joining method. And, in the conveyance jig described above, the core member is used and the laminated iron core pieces 11 are positioned with reference to an inside diameter, but the laminated iron core pieces 11 can also be positioned with reference to an outside diameter using positioning members abutting on an outer peripheral surface of the yoke part 13.

Figure 7:
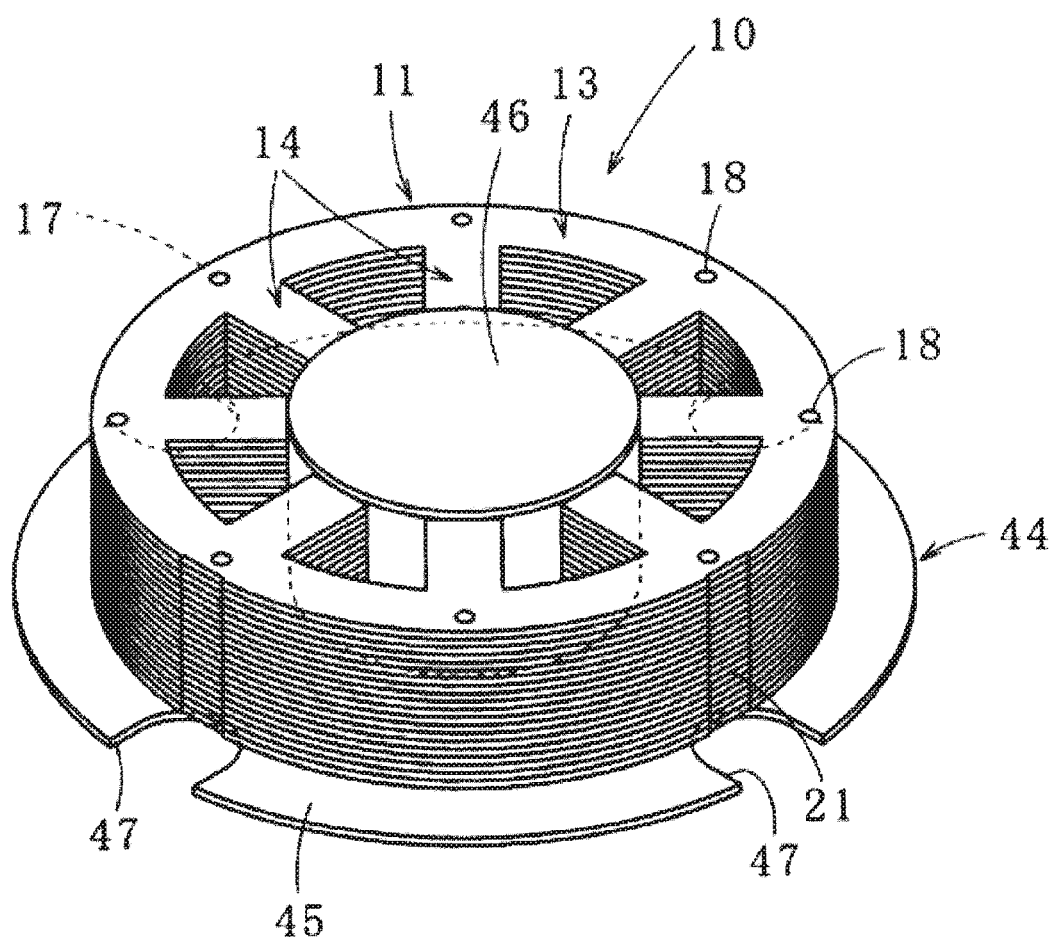
FIG. 7 is a perspective view showing a state in which the caulking blocks are detached from the laminated iron core.

Subsequently, as shown in FIG. 7, the caulking blocks 12 laminated and integrated are pulled in the radial direction of the iron core pieces 11 and are detached from the laminated iron core 10. Accordingly, the iron core pieces 11 restricted by the integrated caulking blocks 12 are released, and the iron core pieces 11 are aligned along the core member 46, and the laminated iron core 10 with higher accuracy is obtained (the above is a fifth step).

Then, the through holes 17 are filled with the resins 18, and the plurality of iron core pieces 11 are joined (fixed) in the lamination direction. Here, resin sealing (resin bonding) of the laminated iron core 10 can be performed by conveying the laminated iron core 10, for example, between upper die and a lower die with the laminated iron core 10 placed on the conveyance jig 44 and pinching the laminated iron core 10 and then filling the through holes 17 with the resins 18. In addition, in the case of mutually joining the iron core pieces, an adhesive or welding other than the resin described above can be used and further, any two or more of the resin, the adhesive and the welding can be used in combination (the above is a sixth step).

Figure 8:
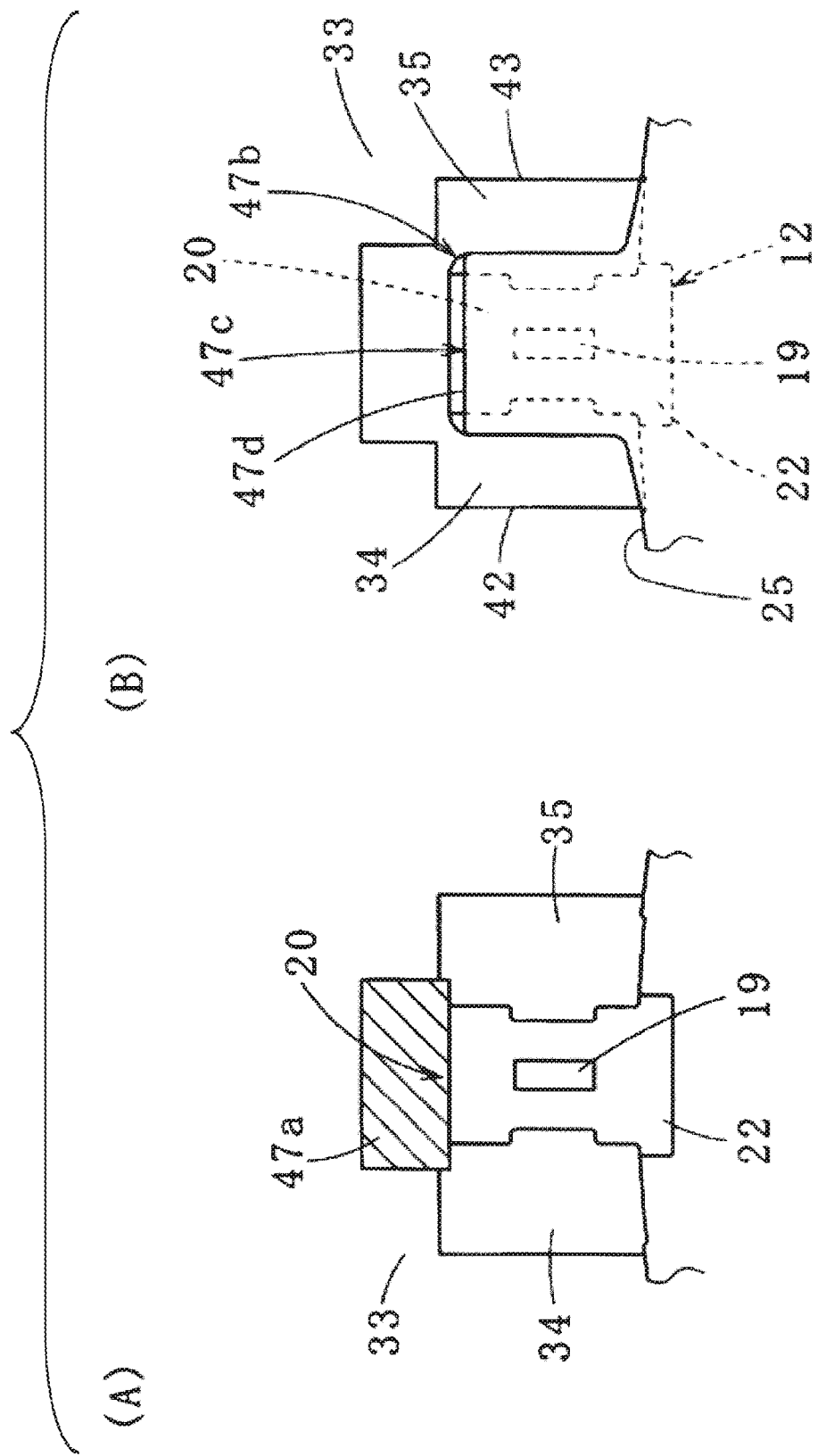
FIG. 8 includes (A) and (B) explanatory diagrams according to a modified example of the method for manufacturing the laminated iron core according to the first embodiment of the present invention.

In the case of blanking the plurality of iron core pieces 11, before the iron core piece 11 in the state including the caulking block 12 is blanked and formed in the fourth step, as shown in FIG. 8(A), for example, a rectangular previous blanking part 47*a* exceeding the width of the caulking part 20 can also be formed in a radial outside region from the caulking part 20 formed with the caulking projection 19. Here, a state exceeding the width of the caulking part 20 refers to a state in which the length of a radial inside side of the rectangular previous blanking part 47*a* exceeds the width of the distal end of the radial outside of the caulking part 20 and both corners of the radial inside of the previous blanking part 47*a* overlap with the first and second side regions 34, 35.

Then, as shown in FIG. 8(B), when the iron core piece 11 is blanked so that the final blanking outer shape line 25 of the iron core piece 11 shown in FIG. 2(A) intersects with the blanking lines 42, 43 of both sides of the first and second side regions 34, 35 in the width direction, the iron core piece 11 can be blanked inside a die 47b. In addition, in a punch 47c for performing final blanking of the iron core piece 11, a contour line 47d of the punch 47c in a region in contact with the caulking part 20 is located in the radial inside from the distal end of the caulking part 20, and with the caulking block 12 joined to the iron core piece 11, the iron core piece 11 is blanked inside the die 47b.

By forming the previous blanking part 47a, before the iron core piece 11 is blanked and formed, the caulking part 20 is in a state in which the caulking part 20 is separated from the strip material 33 and is separably joined to the iron core piece 11 (strip material 33) through the joining part 22. Consequently even when the iron core piece 11 is blanked inside the die 47b with the caulking block 12 joined, an elastic recovery phenomenon does not occur in the caulking part 20, and a force of friction between the distal end of the caulking part 20 and an inner periphery of the die 47b can be prevented from becoming excessive. As a result, in the case of caulking and laminating the caulking block 12 joined to the iron core piece 11 and forming the laminated iron core 10, the caulking part 20 can be prevented from being detached from the iron core piece 11 due to the force of friction between the distal end of the caulking part 20 and the inner periphery of the die 47b, and a manufacturing yield of the laminated iron core 10 can be improved.

Figure 9:
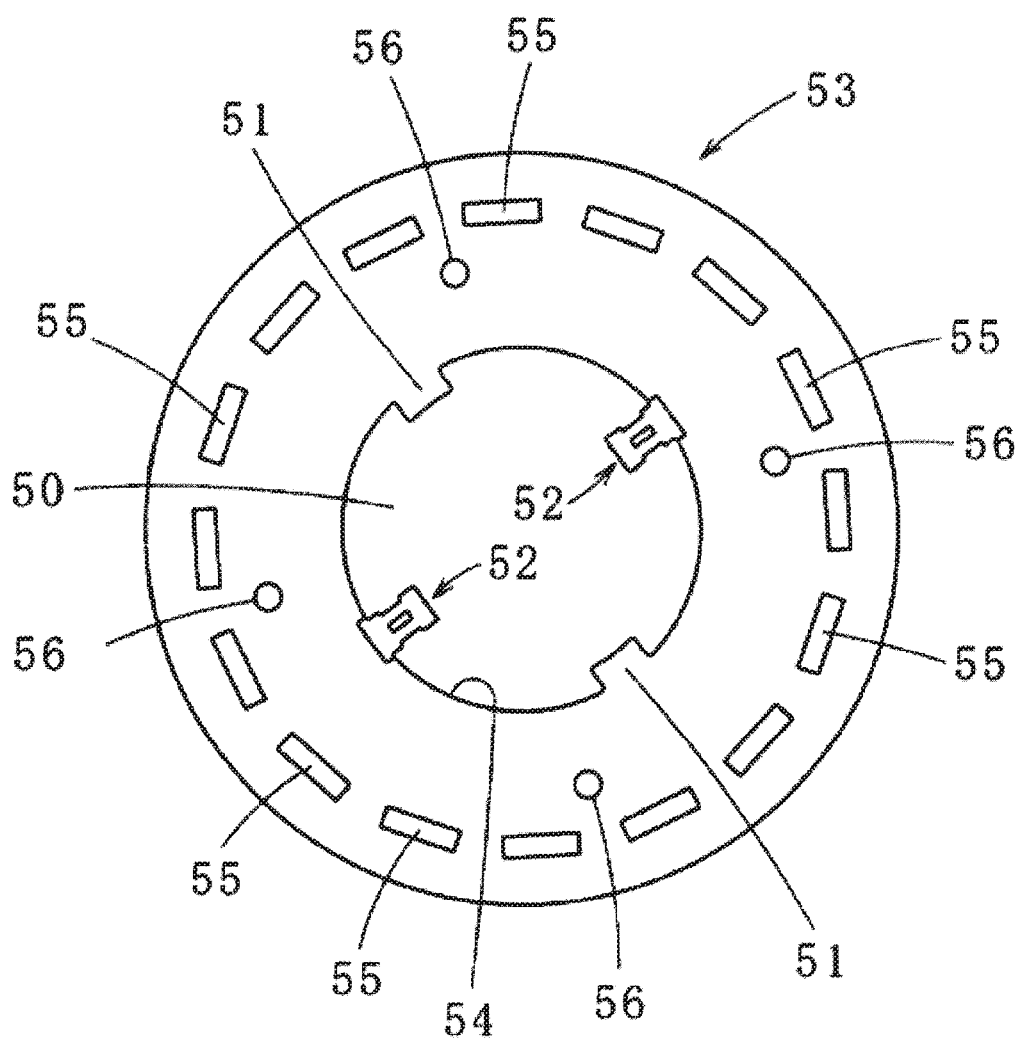
FIG. 9 is a plan view of an iron core piece used in a method for manufacturing the laminated iron core according to the second embodiment of the present invention.

A method for manufacturing the laminated iron core according to a second embodiment of the present invention is a method for manufacturing a laminated iron core made of a rotor iron core (rotor). As shown in FIG. 9, an iron core piece 53 having a shaft hole 50 formed in the center, opposed key piece parts 51 projected to a radial inside of the shaft hole 50, and, for example, two caulking blocks 52 opposed and formed in regions of angular positions different from the key piece parts 51 in the radial inside of the shaft hole 50 is fabricated and the iron core pieces 53 are caulked and laminated, and the caulking blocks 52 are detached from the laminated iron core pieces 53 and then, the laminated iron core pieces 53 are fixed. In addition, numeral 54 is a shaft hole outer shape line of the iron core piece 53, and numeral 55 is a blanked hole which is formed along a circumferential direction of the iron core piece 53 and constructs a magnet-insert part of the rotor iron core, and numeral 56 is a through hole constructing a through part injected with a resin at the time of fixing the iron core pieces 53. Hereinafter, description will be made in detail.

The iron core piece 53 fabricated by the method for manufacturing the laminated iron core according to the second embodiment of the present invention is fabricated in a fabrication process shown in FIGS. 10(A) to 10(D). In a first step shown in FIG. 10(A), in a strip material 57, a pair of prepared holes 59, 60 having a blanking contour line constructed of a contour line of the key piece parts 51, a contour line of a bridge piece part 58 and a part of the shaft hole outer shape line 54 is blanked and formed so that a region formed with the shaft hole 50 (see FIG. 10(D)) formed in the center of the iron core piece 53 blanked and formed is formed with the opposed key piece parts 51 projected to the radial inside of the shaft hole 50 and the bridge piece part 58 astride the shaft hole 50 in the angular positions different from the key piece parts 51, and first and second side regions 61, 62 including the shaft hole outer shape line 54 and forming both lateral sides of the caulking blocks 52 are then blanked in radial outside regions of the bridge piece part 58. In addition, the bridge piece part 58 can be formed in a state in which the radial outside regions are provided with the first and second side regions 61, 62 forming both lateral sides of the caulking blocks 52. Then, in a second step shown in FIG. 10(B), a caulking projection 63 is formed between the first and second side regions 61, 62, for example, in the center of the first and second side regions 61, 62.

Figure 10:
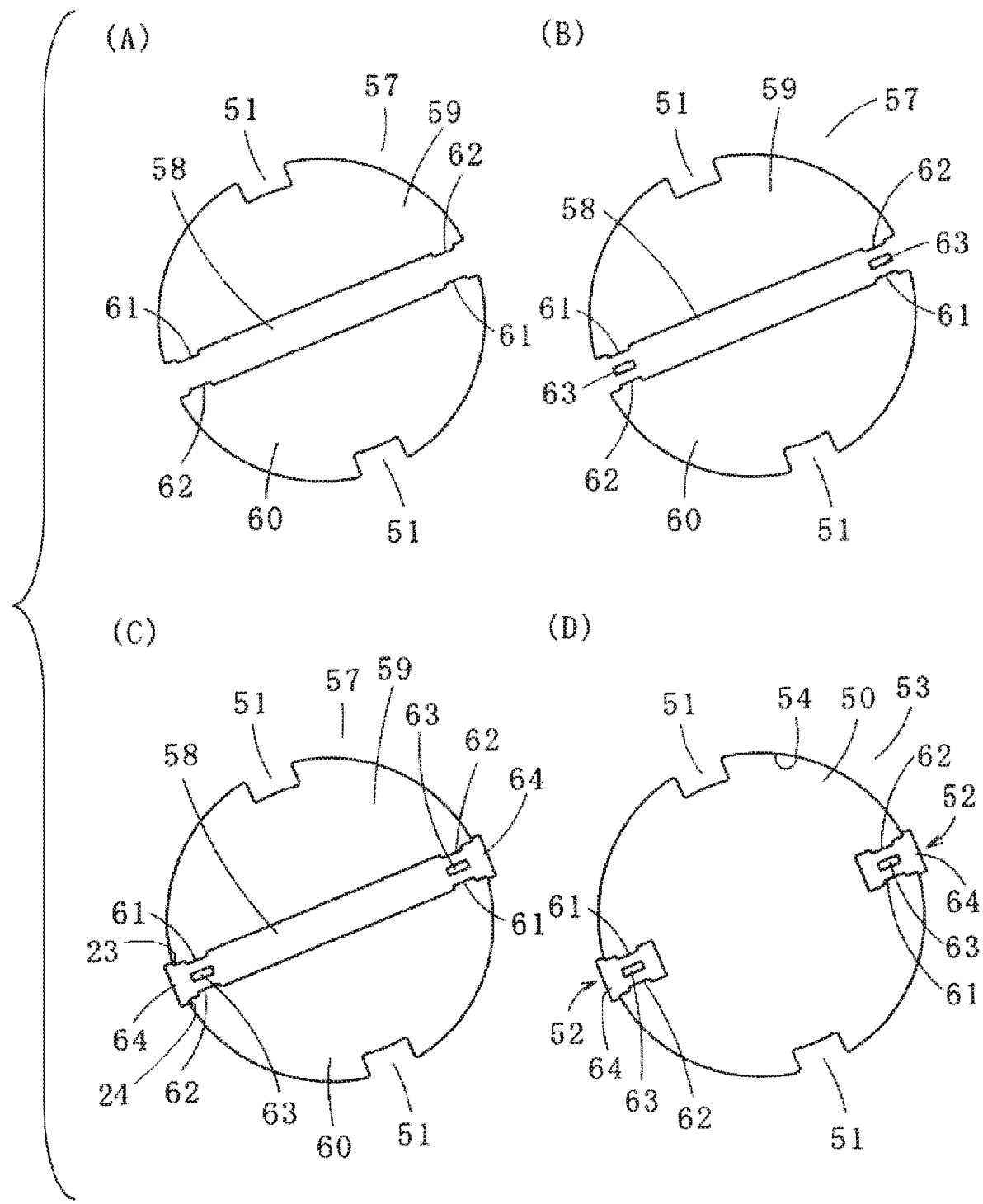
FIG. 10 includes (A) to (D) explanatory diagrams showing fabrication processes of the iron core piece used in the method for manufacturing the laminated iron core.

As shown in FIG. 10(A), in the case of forming the first and second side regions 61, 62, a hooking part having a recessed shape is preferably formed. That is, in the case of forming a caulking part used as the caulking block, a side radially extending in the caulking block is preferably formed with the hooking part having the recessed shape in which a jig can enter in the case of pulling out.

Here, the caulking projection 63 is formed by, for example, half blanking caulking or V caulking. Also, the center of the first and second side regions of the caulking block formed on the iron core piece with the first order of lamination is formed with a caulking hole (through hole) into which the caulking projection 63 is fitted. In addition, the orders of the first step and the second step described above may be replaced and further, the caulking projection 63 (caulking hole in the iron core piece with the first order of lamination) can be formed in a third step of FIG. 10(C) (that is, the caulking projection (caulking hole) can be formed in any step before an outer shape of the iron core piece 53 is blanked). And, in the iron core piece with the first order of lamination, the caulking projection 63 into which the caulking projection 63 is fitted can also be formed instead of the caulking hole.

In addition, as shown in the drawing, in the case of forming the caulking part used as the caulking block, the caulking part is preferably formed with the caulking projection 63 with a flat shape having a short axis and a long axis longer than the short axis so that the long axis extends along the pullout direction.

In the third step shown in FIG. 10(C), a joining part 64 by which the caulking block 52 is connected to the iron core piece 53 is formed by push back processing, and the caulking block 52 changes to a state in which the caulking block 52 is separably joined to the iron core piece 53 (strip material 57). In this third step, the caulking part is preferably formed with shoulder parts 23, 24 as shown in FIG. 10(C). More concretely as shown in FIG. 10(C), the caulking part 20 can be formed with the shoulder parts 23, 24 by performing the push back processing using a die unit having a dimension larger than a circumferential dimension of a root site of the side of the iron core piece 11 in the caulking part 20 in the case of forming the joining part 64. That is, in the case of the push back processing, the root site of the side of the iron core piece 53 in the caulking part constructing the caulking block 52 is preferably formed with the shoulder parts 23, 24 having surfaces extending in the radial direction and surfaces extending in the circumferential direction.

In a fourth step shown in FIG. 10(D), a radial inside region of the bridge piece part 58 (a radial inside region from the caulking projections 63 (caulking holes in the iron core piece with the first order of lamination) oppositely arranged in both sides of the bridge piece part 58) is blanked and removed and then, an outer shape (an outer shape line is not shown) of the iron core piece 53 is blanked and formed, and the iron core pieces 53 with the caulking blocks 52 are caulked and laminated.

Then, in a fifth step, the iron core pieces 53 laminated through the caulking blocks 52 are arranged on a jig and then, the caulking blocks 52 are pulled to the radial inside and are detached from the laminated iron core pieces 53 and in a sixth step, the laminated iron core pieces 53 are fixed. Here, the jig used in the case of detaching the caulking blocks 52 from the laminated iron core pieces 53 can include, for example, a placement table for supporting the laminated iron core pieces 53, a positioning member which is formed on the placement table and positions the laminated iron core pieces 53 with reference to an outside diameter, and an upper die for pressing the laminated iron core pieces 53 after positioning and pinching the iron core pieces 53 between the placement table and the upper die. Resin filling of a through part (a through part made of the through hole 56 formed in the laminated iron core pieces 53) of a laminated iron core performed in fixing of the iron core pieces 53 can be performed by filling the through part with a resin in a state in which the laminated iron core is placed on the jig, for example, the laminated iron core is pinched between the upper die and the placement table. In addition, in the case of mutually joining the iron core pieces, an adhesive or welding other than the resin can be used and further, any two or more of the resin, the adhesive and the welding can be used in combination.

Figure 11:
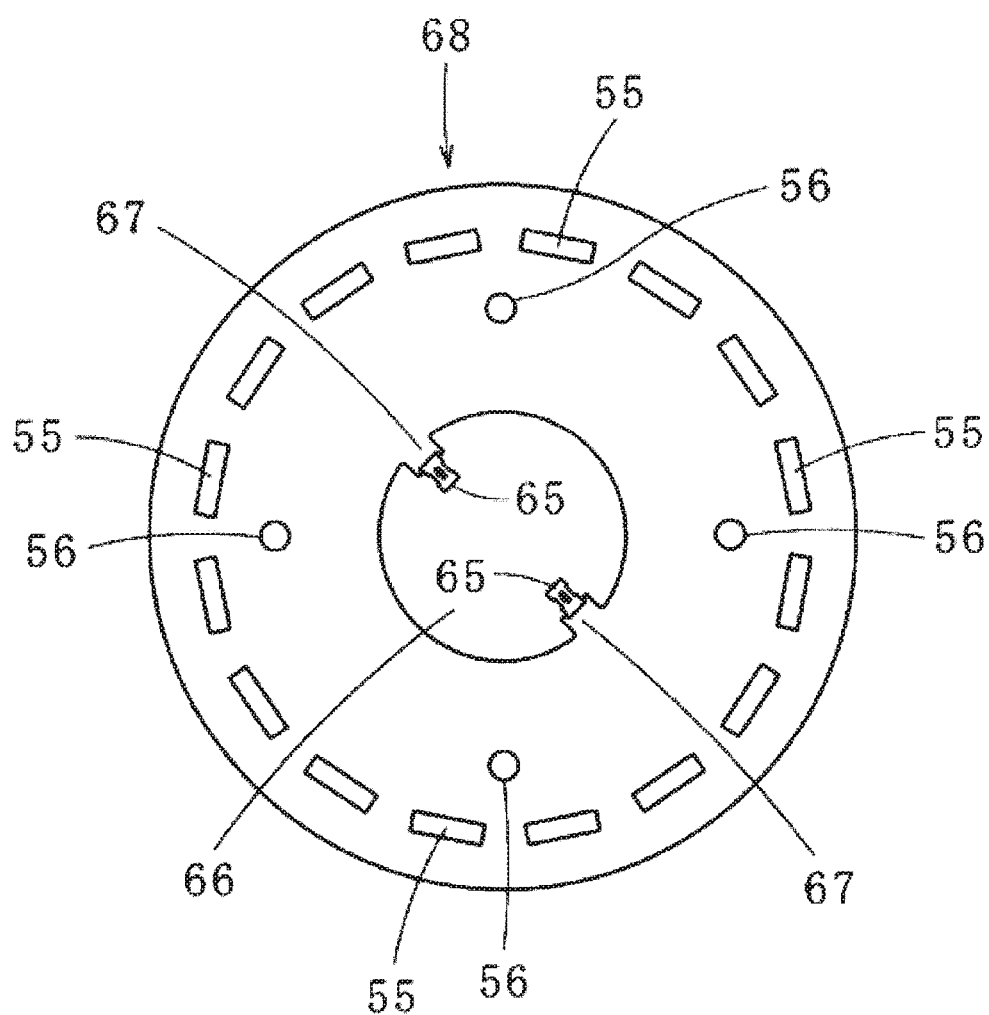
FIG. 11 is a plan view of an iron core piece according to a modified example.

In a conventional manufacturing method for sliding and detaching the caulking blocks from the laminated iron core formed by caulking and laminating the iron core pieces with the caulking blocks in a lamination direction (a vertical (longitudinal) direction herein), a rate of occurrence of peeling in a slide direction becomes higher as the thickness of the iron core piece becomes thinner, with the result that an effect of the present invention becomes more remarkable when the thickness of the iron core piece 53 (strip material 57) is 0.2 mm or less. Also, the iron core piece 53 is blanked from the one strip material 57, but the plurality of iron core pieces can simultaneously be blanked from the plurality of (for example, two, or three or more) stacked strip materials 57. In the method for manufacturing the laminated iron core according to the second embodiment of the present invention, the caulking blocks 52 are formed in the regions of the angular positions different from the key piece parts 51 in the radial inside of the shaft hole 50, and the iron core pieces 53 are caulked and laminated to manufacture the laminated iron core, but as show in FIG. 11, iron core pieces 68 in which caulking blocks 65 are formed in radial inside portions of key piece parts 67 formed in radial inside regions of a shaft hole 66 can also be laminated to manufacture the laminated iron core.

Figure 12:
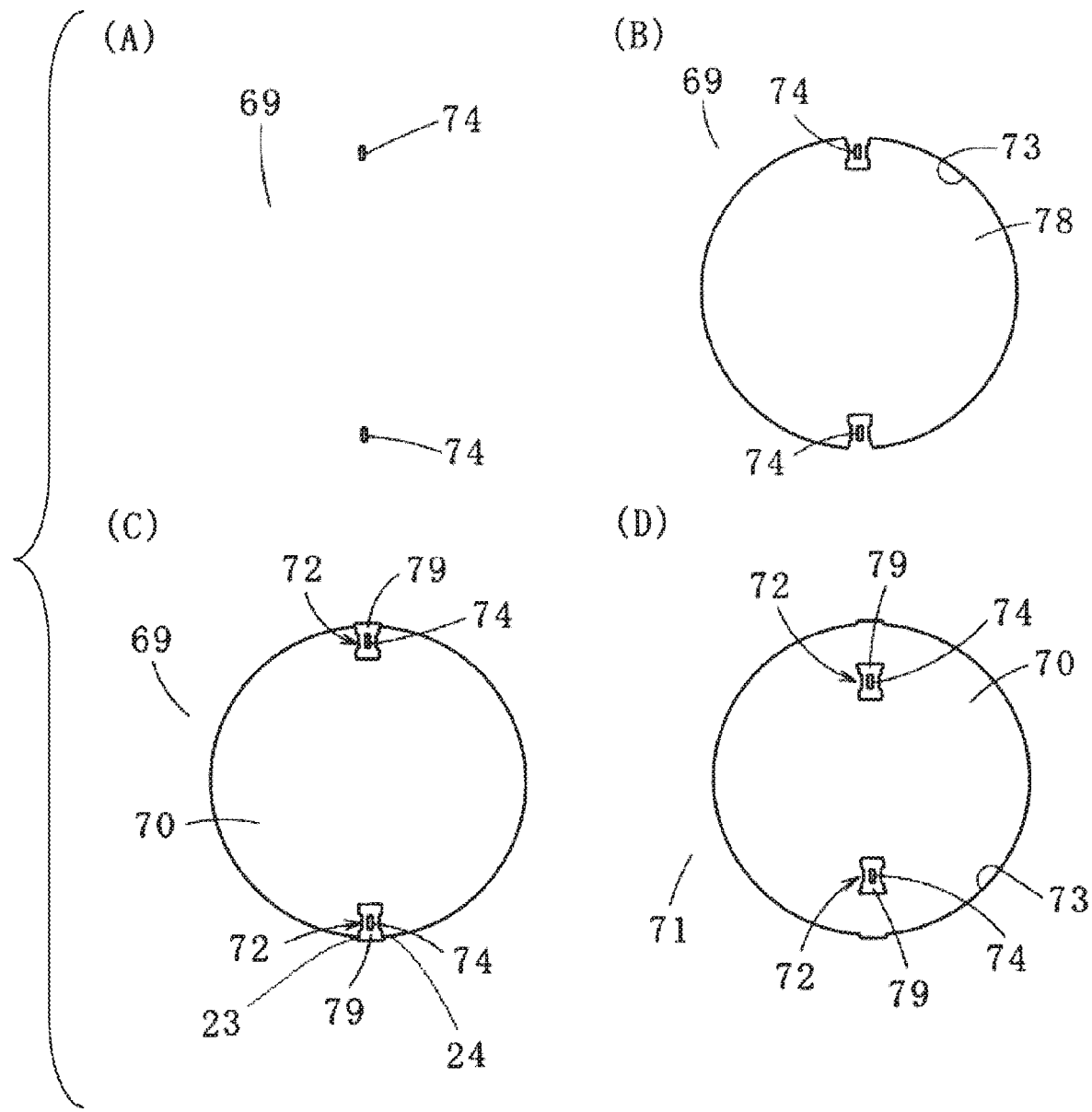
FIG. 12 includes (A) to (D) explanatory diagrams of a method for manufacturing a laminated iron core according to a third embodiment of the present invention.

A method for manufacturing a laminated iron core according to a third embodiment of the present invention is a method for manufacturing a laminated iron core made of a rotor iron core. As shown in FIG. 12(A), using a die unit (not shown), iron core pieces 71 formed with shaft holes 70 in the centers as shown in FIG. 12(D) from a strip material 69 made of, for example, an electromagnetic steel plate with a thickness of about 0.10 to 0.5 mm are caulked and laminated by a plurality of caulking blocks 72 (see FIG. 12(C)) separably formed in radial inside regions of the shaft holes 70, and the iron core pieces 71 are placed on a jig (not shown), and the caulking blocks 72 are pulled to the radial inside and are detached from the laminated iron core pieces 71 and then, the laminated iron core pieces 71 are fixed. In addition, numeral 73 is a shaft hole outer shape line of the shaft hole 70. Hereinafter, description will be made in detail.

Figure 13:
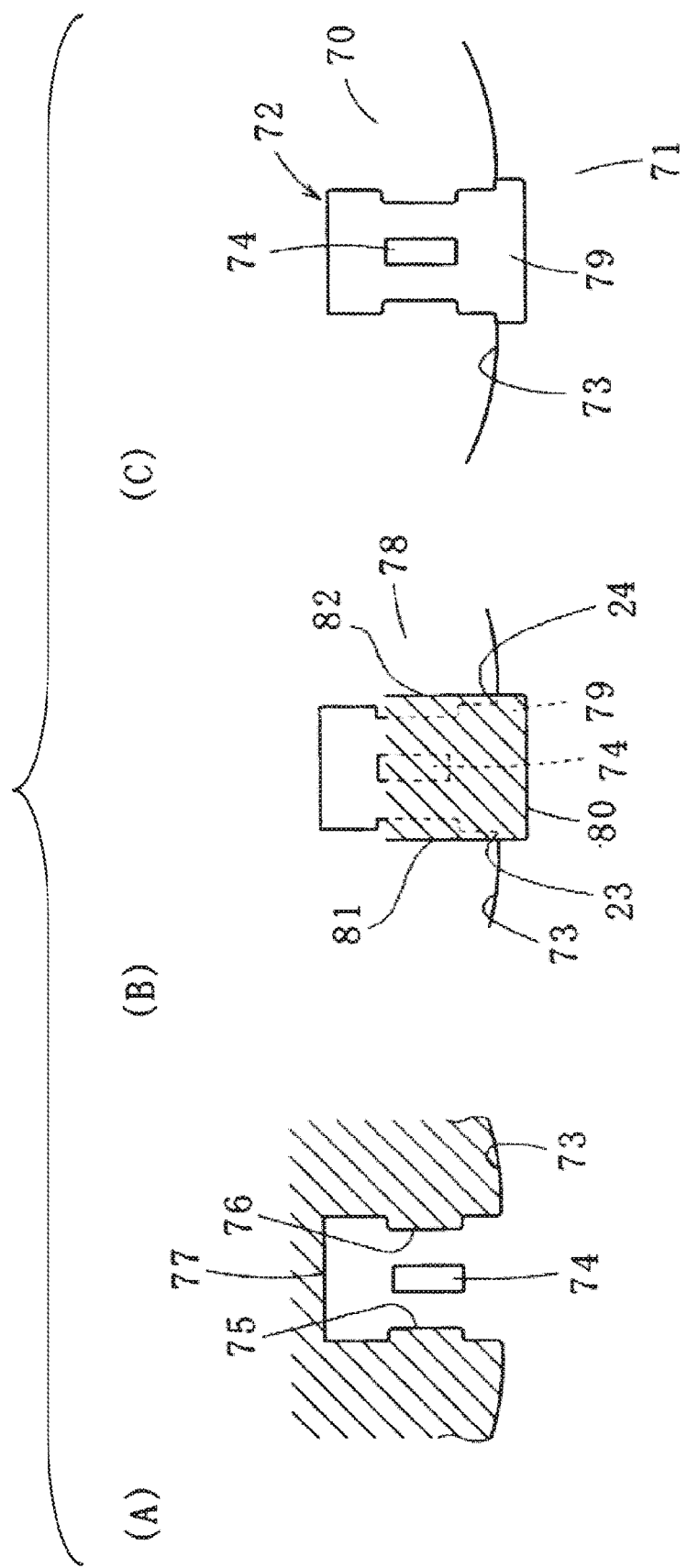
FIG. 13 includes (A) to (C) explanatory diagrams showing fabrication processes of a caulking block formed on an iron core piece used in the method for manufacturing the laminated iron core.
Figure 14:
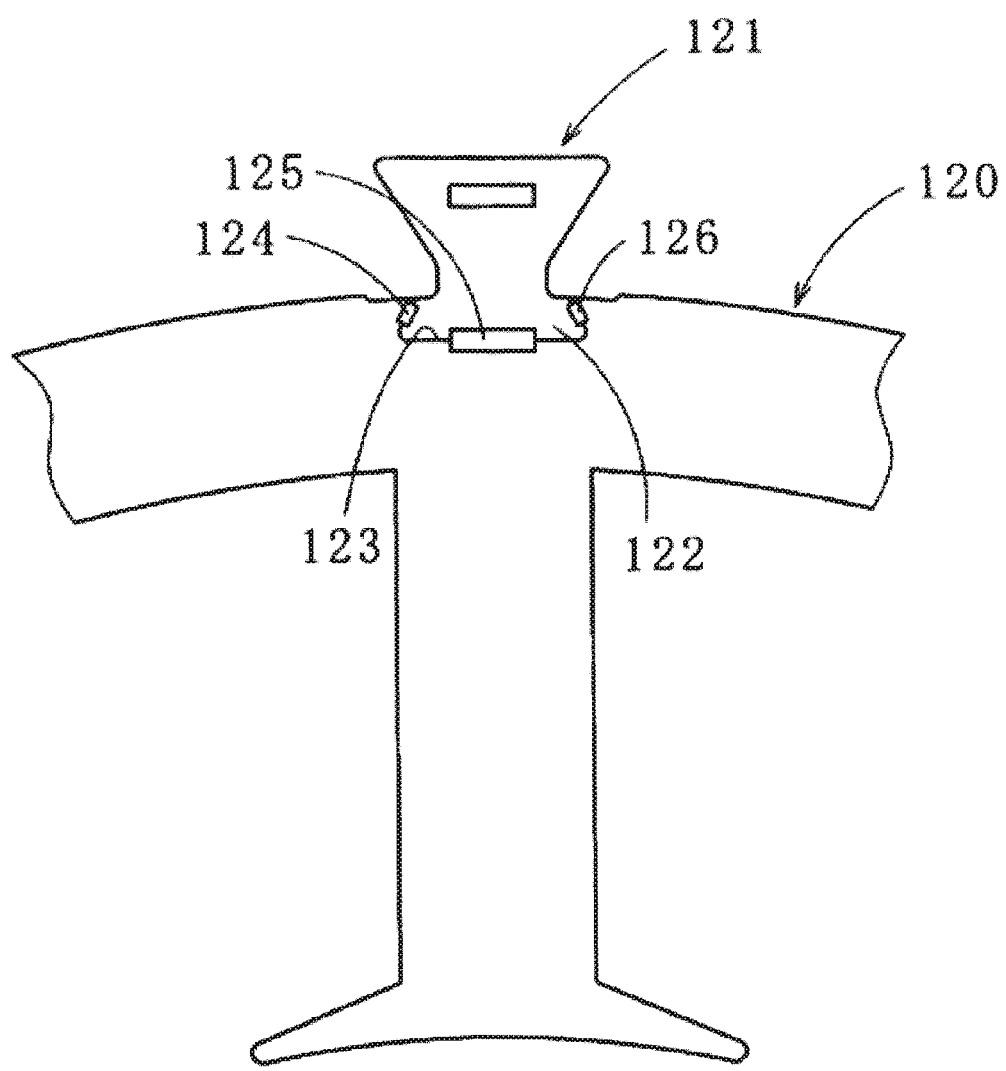
FIG. 14 is a plan view of an iron core piece according to a conventional example.

The method for manufacturing the laminated iron core according to the third embodiment of the present invention has a first step of forming a caulking processing part 74 made of a caulking hole in a region formed with the caulking block 72 of the strip material 69 forming the iron core piece 71 located in the lowermost part and forming caulking processing parts 74 made of caulking projections in regions formed with the caulking blocks 72 of the strip materials 69 forming the second to uppermost iron core pieces 71 as shown in FIG. 12(A), and a second step of leaving the regions formed with the caulking blocks 72 in the strip materials 69 and forming the shaft hole 70, specifically, the second step of blanking and forming a prepared hole 78 having a blanking contour line constructed of opposed contour lines 75, 76 of both lateral sides in a width direction of the caulking block 72 projected to the radial inside of the shaft hole 70, a contour line 77 (connecting the distal ends of the contour lines 75, 76) of the distal side of the caulking block 72, and a part of the shaft hole outer shape line 73 in a region formed with the shaft hole 70 formed in the center of the iron core piece 71 as shown in FIGS. 12(B) and 13(A).

As shown in FIGS. 12(B) and 13(A), in the second step, a hooking part having a recessed shape is preferably formed in the case of processing the contour lines 75, 76. That is, in the case of forming a caulking part used as the caulking block, a side radially extending in the caulking block is preferably formed with the hooking part having the recessed shape in which a jig can enter in the case of pulling out.

Also, the method for manufacturing the laminated iron core according to the third embodiment of the present invention has a third step of forming a joining part 79 by which the caulking block 72 is connected to the iron core piece 71 by push back processing (forming the shaft hole contour line 73 of the shaft hole 70 by connecting a contour line 80 of the joining part 79 to a contour line of the prepared hole 78) as shown in FIG. 13(B) and separably joining the caulking block 72 to the iron core piece 71 as shown in FIGS. 12(C) and 13(C). Here, the contour line 80 of the joining part 79 is connected to the contour line of the prepared hole 78 so that cut lines 81, 82 including both sides of the joining part 79 intersect with the blanking contour line of the prepared hole 78 as shown in FIG. 13(B). Accordingly the caulking part is formed with shoulder parts 23, 24, and the caulking block 72 can surely be separated from the iron core piece 71 in a fourth step described below. More concretely as shown in FIG. 13(B), the caulking part 20 can be formed with the shoulder parts 23, 24 by performing the push back processing using a die unit having a dimension larger than a circumferential dimension of a root site of the side of the iron core piece 11 in the caulking part 20 in the case of forming the joining part 79. That is, in the case of the push back processing, the root site of the side of the iron core piece 71 in the caulking part constructing the caulking block 72 is preferably formed with the shoulder parts 23, 24 having sides extending in the radial direction and sides extending in the circumferential direction.

Further, the method for manufacturing the laminated iron core according to the third embodiment of the present invention has the fourth step of caulking and laminating the iron core pieces 71 and mounting the iron core pieces 71 on a jig (not shown) and pulling the caulking blocks 72 to the radial inside and detaching the caulking blocks 72 from the laminated iron core pieces 71 as shown in FIG. 12(D). Then, through parts (not shown) of the laminated iron core pieces 71 are filled with resins and the plurality of iron core pieces 71 are joined (fixed) in the lamination direction to thereby obtain the laminated iron core. In addition, in the method for manufacturing the laminated iron core according to the third embodiment of the present invention, the caulking processing parts 74 are in the first step, but the caulking processing parts 74 can be formed in any step before an outer shape of the iron core piece 71 is blanked.

In addition, in the case of forming the caulking part used as the caulking block, the caulking part is preferably formed with the caulking processing part 74 (one example of the caulking projection) with a flat shape having a short axis and a long axis longer than the short axis so that the long axis extends along the pullout direction.

The present invention has been described above with reference to the embodiments, but the present invention is not limited to the configuration described in the embodiments described above, and also includes other embodiments and modified examples contemplated within the scope of the matter described in the claims. For example, the case of constructing the laminated iron core and the method for manufacturing the laminated iron core of the present invention by combining a part or all of the respective embodiments and modified examples described above is also included in the scope of right of the present invention. The embodiments described above describe the case of applying the laminated iron core and the method for manufacturing the laminated iron core of the present invention to the inner rotor type stator iron core in which the rotor iron core is arranged inside the stator iron core with the rotor iron core having a gap, but the laminated iron core and the method for manufacturing the laminated iron core of the present invention can also be applied to an inner rotor type rotor iron core, and to an outer rotor type rotor iron core or an outer rotor type stator iron core in which the rotor iron core is arranged outside the stator iron core with the rotor iron core having a gap. Further, the embodiments described above describe the case of mutually joining the iron core pieces adjacent in the lamination direction after the caulking block is detached from the laminated iron core, but after the iron core pieces are first mutually joined, the caulking block may be detached from the laminated iron core.

Figure 15:
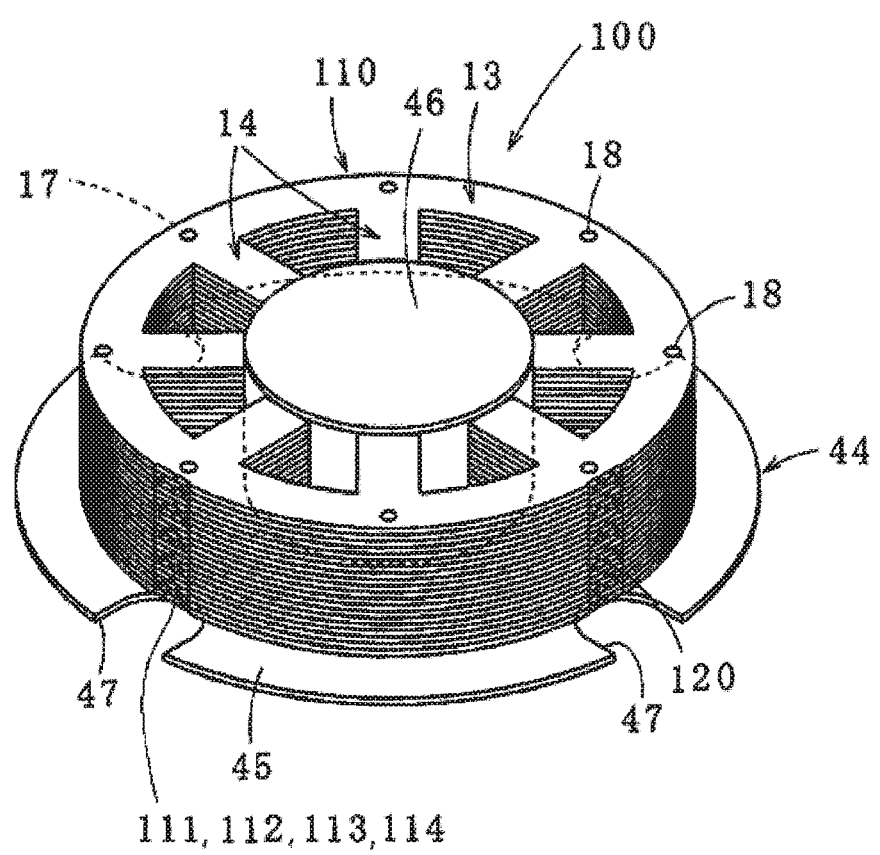
FIG. 15 is a perspective view showing a laminated iron core according to a modified example of the present invention.
Figure 16:
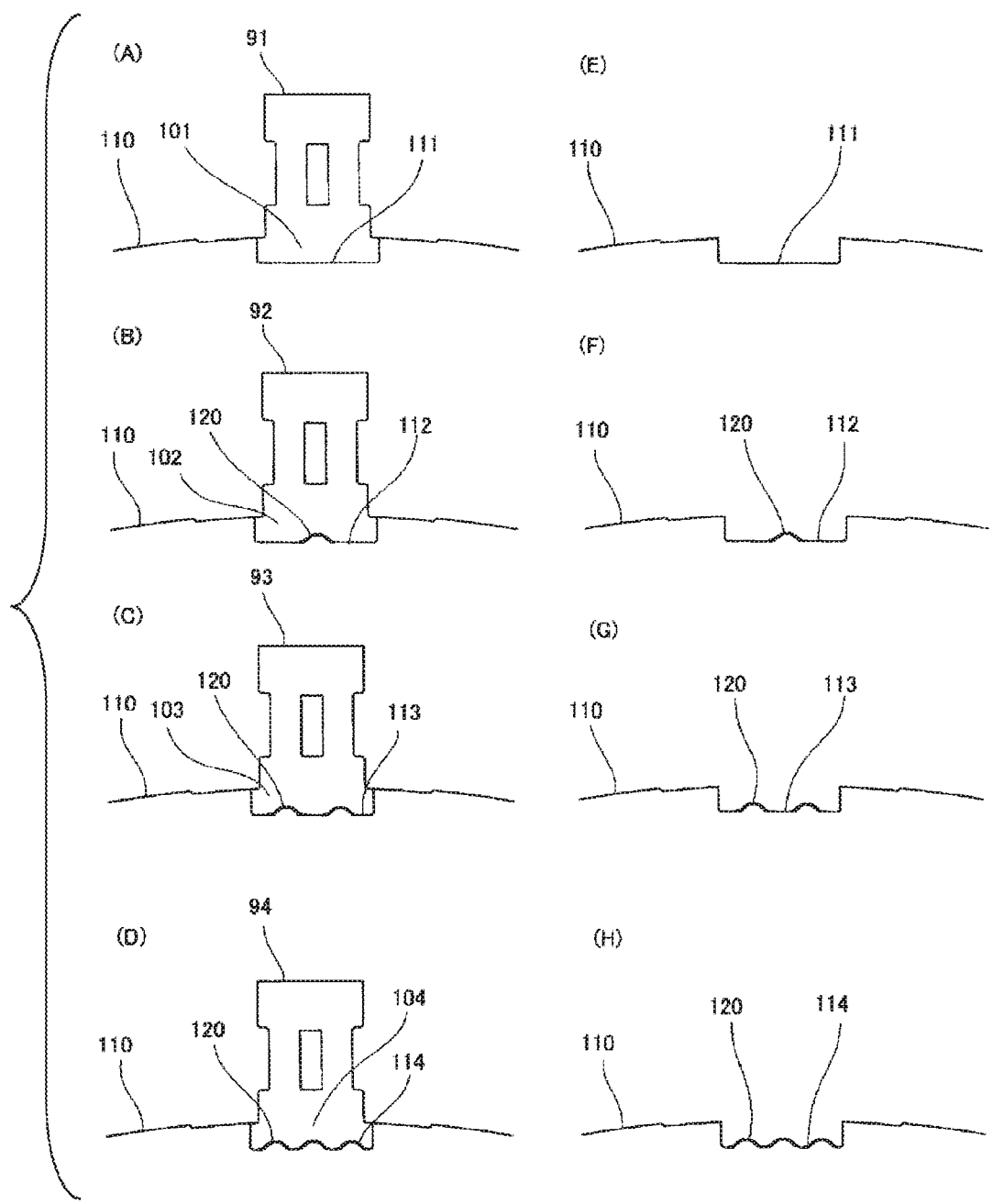
FIG. 16 includes (A) to (H) are plan views of a first caulking block to a fourth caulking block formed on an iron core piece constructing the laminated iron core shown in FIG. 15.

FIG. 15 is a perspective view showing a laminated iron core 100 according to a modified example of the present invention. FIG. 16 is plan views of a first caulking block 91 to a fourth caulking block 94 formed on an iron core piece 110 constructing the laminated iron core 100 shown in FIG. 15. FIGS. 16(A) to 16(D) show a state in which the first caulking block 91 to the fourth caulking block 94 are joined to the iron core piece 110, and FIGS. 16(E) to 16(H) show a state in which the first caulking block 91 to the fourth caulking block 94 are detached from the iron core piece 110.

The iron core piece 110 constructing the laminated iron core 100 according to the present modified example is provided with the four caulking blocks 91 to 94 of the first caulking block 91, the second caulking block 92, the third caulking block 93 and the fourth caulking block 94. The first caulking block 91 to the fourth caulking block 94 are formed on an outer periphery of the iron core piece 110. The first caulking block 91 to the fourth caulking block 94 are formed at equal distances in a circumferential direction.

The first caulking block 91 to the fourth caulking block 94 have a first joining part 101 to a fourth joining part 104, respectively. The first joining part 101 to the fourth joining part 104 are fitted into a first fitting part 111 to a fourth fitting part 114 formed on an outer peripheral edge of the iron core piece 110, respectively.

The first caulking block 91 shown in FIG. 16(A) has the first joining part 101 whose distal end has a linear shape. The iron core piece 110 is provided with the first fitting part 111 into which this first joining part 101 is fitted. This first fitting part 111 is a recess having a linear bottom part. When the first caulking block 91 is detached from the iron core piece 110, the first fitting part 111 is exposed to the outside as shown in FIG. 16(E).

The second caulking block 92 shown in FIG. 16(B) has the second joining part 102 whose distal end is provided with one recess. The iron core piece 110 is provided with the second fitting part 112 into which this second joining part 102 is fitted. This second fitting part 112 has one protrusion 120. When the second caulking block 92 is detached from the iron core piece 110, the second fitting part 112 including the one protrusion 120 is exposed to the outside as shown in FIG. 16(F).

The third caulking block 93 shown in FIG. 16(C) has the third joining part 103 whose distal end is provided with two recesses. The third fitting part 113 into which this third joining part 103 is fitted has two protrusions 120. When the third caulking block 93 is detached from the iron core piece 110, the third fitting part 113 including the two protrusions 120 is exposed to the outside as shown in FIG. 16(G).

The fourth caulking block 94 shown in FIG. 16(D) has the fourth joining part 104 whose distal end is provided with three recesses. The fourth fitting part 114 into which this fourth joining part 104 is fitted has three protrusions 120. When the fourth caulking block 94 is detached from the iron core piece 110, the fourth fitting part 114 including the three protrusions 120 is exposed to the outside as shown in FIG. 16(H).

The laminated iron core 100 is obtained by laminating the plurality of iron core pieces 110 as described above. At this time, for example, for the purpose of dispersing variations in thickness of a strip material, the iron core pieces 110 may be rotated and laminated.

In the present modified example, in the case of laminating the second iron core piece 110 on the first iron core piece 110, the second iron core piece 110 is laminated with the second iron core piece 110 rotated 90° circumferentially with respect to the first iron core piece 110. Next, in the case of laminating the third iron core piece 110 on the second iron core piece 110, the third iron core piece 110 is laminated with the third iron core piece 110 rotated 90° circumferentially with respect to the second iron core piece 110. Thus, in the case of sequentially laminating the nth iron core piece 110 on the (n−1)th iron core piece 110, the nth iron core piece 110 is laminated with the nth iron core piece 110 rotated circumferentially with respect to the (n−1)th iron core piece 110.

After the iron core pieces 110 are rotated and laminated and the iron core pieces 110 are caulked and laminated in this manner, when the first caulking block 91 to the fourth caulking block 94 are radially pulled and detached, the first fitting part 111 to the fourth fitting part 114 of the iron core pieces 110 are exposed to the outside. Hence, for example, attention is paid to the first fitting part 111, and it is checked that the first fitting parts 111 are regularly shifted in the circumferential direction and thereby, it can be examined that the iron core pieces 110 are correctly rotated and laminated. In an example shown in FIG. 15, the iron core pieces 110 are correctly rotated and laminated when the first fitting parts 111 are shifted counterclockwise in order from the upward side to the downward side of FIG. 15. In this examination, a person may make a visual examination, or a camera etc. may make a mechanical examination.

This examination step is preferably performed before through holes 17 are filled with resins 18 and the plurality of iron core pieces 110 are joined (fixed) in the lamination direction.

Also, by checking that the first fitting parts 111 are shifted in the circumferential direction in this manner, it can easily be grasped that the iron core pieces 110 are rotated and laminated with one iron core piece 110 shifted in the circumferential direction at any angle.

Or, in the case where respective shapes of the first fitting part 111 to the fourth fitting part 114 are mutually different like the present modified example, the first fitting part 111 to the fourth fitting part 114 having the mutually different shapes are regularly arranged in the lamination direction when the iron core pieces 110 are correctly rotated and laminated. In the example shown in FIG. 15, no protrusion, one protrusion 120, two protrusions 120 and three protrusions 120 appear regularly from the upward side to the downward side of FIG. 15. As a result, it can be examined whether or not the iron core pieces 110 are correctly rotated and laminated by determining whether or not the first fitting part 111 to the fourth fitting part 114 having the different shapes are regularly arranged in the lamination direction.

In addition, a plurality of caulking blocks may have mutually different shapes (not shown). When the shapes of the caulking blocks are different in the case of rotating and laminating the plurality of iron core pieces 110, the portions of the different shapes of the caulking blocks appear regularly in the circumferential direction for reason similar to the above. As a result, it is easy to correctly rotate and laminate the iron core pieces 110. In addition, a site at which the shape of the caulking block is different from that of the different caulking block is preferably formed on the outermost side in the pullout direction so as not to become an obstacle in the case of gripping the caulking block by a jig.

In addition, in the present modified example, the example in which the first fitting part 111 to the fourth fitting part 114 have the mutually different shapes is described, but the present invention is not limited to this example. When at least one fitting part has a shape different from that of the other fitting parts, it can be examined that the iron core pieces 110 are correctly rotated and laminated by checking that the fitting parts having the shape different from that of the other fitting parts are regularly shifted in the circumferential direction. Also, the number of fitting parts is not limited to four. Also, the angle of rotation in the case of rotating and laminating the iron core pieces is not limited to 90°.

Also, in the example described above, the shape in which the recesses forming the second fitting part 112 to the fourth fitting part 114 are formed with the protrusions is described, but the shape of fitting part is not limited to the example described above. The recess forming the fitting part may have a recess or a notch. Alternatively, the fitting part itself may have a notch shape or a protrusion shape.

Also, in the example described above, the example of rotation and lamination every time at which the iron core pieces are rotated and laminated by one piece is described, but it is not limited to this example, and block rotation and lamination at which the iron core pieces are rotated and laminated by a plurality of pieces may be performed.

The present application is based on Japanese patent application No. 2014-231647 filed on Nov. 14, 2014 and Japanese patent application No. 2015-202570 filed on Oct. 14, 2015, the contents of which are hereby incorporated by reference.

INDUSTRIAL APPLICABILITY

The present invention provides a laminated iron core capable of being manufactured economically with good workability even using an iron core piece provided with a caulking block, and a method for manufacturing the laminated iron core.

REFERENCE SIGNS LIST 10, 10a: LAMINATED IRON CORE
11, 11a: IRON CORE PIECE
12, 12a: CAULKING BLOCK
13, 13a: YOKE PART
14, 14a: MAGNETIC POLE PART
15, 15a: YOKE PIECE PART
16, 16a: MAGNETIC POLE PIECE PART
17, 17a: THROUGH HOLE
18, 18a: RESIN
19: CAULKING PROJECTION
20: CAULKING PART
20a: HOOKING PART
20b: CAULKING PART
20c: HOOKING PART
20d: CAULKING PART
20e: HOLE
20f: HOOKING PART
20g: CAULKING PART
20h: HOOKING PART
20i: CAULKING PART
20j: HOOKING PART
20k: CAULKING PART
20m: HOOKING PART
20n: CAULKING PART
20p: HOOKING PART
21: FITTING PART
22: JOINING PART
23, 24: SHOULDER PART
25: FINAL BLANKING OUTER SHAPE LINE
26: STEP
27: CAULKING BLOCK
28: JOINING PART
29: OBLIQUE SIDE
30: CAULKING BLOCK
31: JOINING PART
32: OBLIQUE SIDE
33: STRIP MATERIAL
34: FIRST SIDE REGION
35: SECOND SIDE REGION
36: OUTER SHAPE LINE
37: LATERAL SIDE
38: OUTER SHAPE LINE
39: LATERAL SIDE
40, 41: CUT LINE
42, 43: BLANKING LINE
44: CONVEYANCE JIG (JIG)
45: PLACEMENT TABLE
46: CORE MEMBER
47: NOTCH
47a: PREVIOUS BLANKING PART
47b: DIE
47c: PUNCH
47d: CONTOUR LINE
50: SHAFT HOLE
51: KEY PIECE PART
52: CAULKING BLOCK
53: IRON CORE PIECE
54: SHAFT HOLE OUTER SHAPE LINE
55: BRIDGE HOLE
56: THROUGH HOLE
57: STRIP MATERIAL

58: BRIDGE PIECE PART
59, 60: PREPARED HOLE
61: FIRST SIDE REGION
62: SECOND SIDE REGION
63: CAULKING PROJECTION
64: JOINING PART
65: CAULKING BLOCK
66: SHAFT HOLE
67: KEY PIECE PART
68: IRON CORE PIECE
69: STRIP MATERIAL
70: SHAFT HOLE
71: IRON CORE PIECE
72: CAULKING BLOCK
73: SHAFT HOLE OUTER SHAPE LINE
74: CAULKING PROCESSING PART
75, 76, 77: CONTOUR LINE
78: PREPARED HOLE
79: JOINING PART
80: CONTOUR LINE
81, 82: CUT LINE

The invention claimed is:

1. A laminated iron core including a rotor iron core or a stator iron core in which a plurality of iron core pieces having a predetermined shape are laminated, the laminated iron core comprising:
   a caulking block detachable along a radial direction formed in a radial outside region of each of the iron core pieces,
   wherein the caulking block includes:
   a caulking part projected from the iron core piece and formed with a caulking projection; and
   a joining part engaged with a fitting part of the iron core piece, and
   the caulking part includes a hooking part having a recessed shape and extending in a lamination direction of the laminated iron core,
   wherein outer shape lines of the iron core piece in both sides of the caulking block are joined to a final blanking outer shape line of the iron core piece so as to have steps therebetween, and
   wherein the joining part includes shoulder parts having a width in a radial outside region of the joining part that is wider than a width of the caulking part in a radial inside region.

2. The laminated iron core according to claim 1, wherein the iron core piece has a plurality of fitting parts respectively fitted with joining parts of a plurality of caulking blocks, and
   at least one fitting part of the plurality of fitting parts has a shape different from that of other fitting parts of the plurality of fitting parts.

3. A laminated iron core including a rotor iron core or a stator iron core in which a plurality of iron core pieces having a predetermined shape are laminated, the laminated iron core comprising:
   a caulking block detachable along a radial direction formed in at least one of a radial inside region and a radial outside region of each of the iron core pieces,
   wherein the caulking block includes:
   a caulking part projected from the iron core piece and formed with a caulking projection; and
   a joining part engaged with a fitting part of the iron core piece, and
   the caulking projection has a planar surface, wherein a first dimension of the planar surface extends in a circumferential direction and a second dimension of the planar surface extends in the radial direction, wherein the second dimension is longer than the first dimension.

4. The laminated iron core according to claim 3, wherein the joining part is temporarily fixed to the fitting part by push back processing.

5. The laminated iron core according to claim 3, wherein the joining part has an isosceles trapezoidal shape narrowing in a pullout direction, and a radial length of the joining part is 0.5 to 2 mm, and a distal lower side of the joining part becomes wider than an upper side of the joining part in a range up to 0.2 mm or less.

6. The laminated iron core according to claim 3, wherein the joining part has an isosceles trapezoidal shape widening in a pullout direction, and a radial length of the joining part is 0.5 to 2 mm, and a distal lower side of the joining part becomes narrower than an upper side of the joining part in a range up to 4 mm or less.

7. A method for manufacturing a laminated iron core by laminating a plurality of iron core pieces having a predetermined shape to form a rotor iron core or a stator iron core, the method comprising:
   providing a caulking block detachable along a radial direction formed in a radial outside region of each of the iron core pieces;
   wherein the caulking block includes:
   a caulking part projected from the iron core piece and formed with a hooking part having a recessed shape and extending in a lamination direction of the laminated iron core and a caulking projection; and
   a joining part engaged with a fitting part of the iron core piece,
   the method further comprising:
   laminating and joining the iron core pieces through the caulking blocks;
   pulling the caulking blocks in the radial direction to detach the caulking blocks from the laminated iron core pieces,
   wherein outer shape lines of the iron core piece in both sides of the caulking block are joined to a final blanking outer shape line of the iron core piece so as to have steps therebetween, and
   wherein the joining part includes shoulder parts having a width in a radial outside region of the joining part that is wider than a width of the caulking part in a radial inside region.

8. The method for manufacturing the laminated iron core according claim 7, wherein the iron core piece has a plurality of fitting parts respectively fitted with the joining parts of the plurality of caulking blocks,
   at least one fitting part of the plurality of fitting parts has a shape different from that of other fitting parts of the plurality of fitting parts,
   the iron core pieces are rotated and laminated and the iron core pieces are caulked and laminated, and the caulking blocks are detached and the fitting parts are exposed, and
   examining that the iron core pieces are correctly rotated and laminated by that the iron core pieces are correctly rotated and laminated by checking that the fitting parts having the shape different from that of the other fitting parts are predeterminative periodically shifted in a circumferential direction.

9. A method for manufacturing a laminated iron core, in which a plurality of iron core pieces are caulked and laminated by a caulking block formed in at least one of a radial inside region and a radial outside region of the iron core pieces, and the caulking blocks are detached from the laminated iron core pieces, the method comprising:

blanking first and second side regions in the at least one of the radial inside region and the radial outside region of the iron core piece, wherein the first and second side regions include outer shape lines of the iron core piece and form both lateral sides of the caulking block;

forming a center of the first and second side regions with a caulking projection;

forming a joining part, by which the caulking block is connected to the iron core piece, by push back processing and separably joining the caulking block to the iron core piece;

blanking and forming the iron core piece with the caulking block provided, and caulking and laminating the iron core pieces with the caulking blocks; and pulling the caulking blocks in a radial direction to detach the caulking blocks from the laminated iron core pieces;

wherein before the iron core piece with the caulking block provided is blanked and formed, a previous blanking part is formed in the radial outside region from a caulking part formed with the caulking projection, wherein forming the previous blanking part is separate and distinct from blanking the first and second side regions.

10. The method for manufacturing the laminated iron core according to claim 9, wherein the iron core piece has a plurality of fitting parts respectively fitted with the joining parts of the plurality of caulking blocks, at least one fitting part of the plurality of fitting parts has a shape different from that of other fitting parts of the plurality of fitting parts, the iron core pieces are rotated and laminated and the iron core pieces are caulked and laminated, and the caulking blocks are detached and the fitting parts are exposed, and examining that the iron core pieces are correctly rotated and laminated by checking that the fitting parts having the shape different from that of the other fitting parts are predeterminative periodically shifted in a circumferential direction.

11. A method for manufacturing a laminated iron core made of a rotor iron core, in which an iron core piece with a shaft hole formed in a center and provided with a bridge piece part astride the shaft hole is formed and a caulking block is fabricated in a radial outside region of the bridge piece part and the iron core pieces are caulked and laminated and the caulking blocks are detached from the laminated iron core pieces and then the laminated iron core pieces are fixed, the method comprising:

blanking first and second side regions in the radial outside region of the bridge piece part, wherein the first and second side regions include shaft hole outer shape lines of the iron core piece and form both lateral sides of the caulking block;

of forming a caulking projection between the first and second side regions;

of forming a joining part, by which the caulking block is connected to the iron core piece, by push back processing and separably joining the caulking block to the iron core piece;

blanking and removing a radial inside region of the bridge piece part and then blanking and forming an outer shape of the iron core piece and caulking and laminating the iron core pieces with the caulking blocks;

pulling the caulking blocks to a radial inside and detaching the caulking blocks from the laminated iron core pieces; and fixing the laminated iron core pieces.

12. The method for manufacturing the laminated iron core according to claim 11, wherein the iron core piece has a plurality of fitting parts respectively fitted with the joining parts of the plurality of caulking blocks, at least one first part of the plurality of fitting parts has a shape different from that of other fitting parts of the plurality of fitting parts, the iron core pieces are rotated and laminated and the iron core pieces are caulked and laminated, and the caulking blocks are detached and the fitting parts are exposed, and examining that the iron core pieces are correctly rotated and laminated by checking that the fitting parts having the shape different from that of the other fitting parts are predeterminative periodically shifted in a circumferential direction.

13. A method for manufacturing a laminated iron core made of a rotor iron core which is formed by laminating a plurality of iron core pieces, wherein the iron core pieces have a plurality of fitting parts respectively fitted with joining parts of a plurality of caulking blocks separably formed in radial inside regions of shaft holes, and at least one fitting part of the plurality of fitting parts has a shape different from that of other fitting parts of the plurality of fitting parts, wherein the iron core pieces are rotated and laminated and the iron core pieces are caulked and laminated by the plurality of caulking blocks, and the caulking blocks are pulled to a radial inside and are detached from the laminated iron core pieces and then the fitting parts are exposed, and examining that the iron core pieces are correctly rotated and laminated by checking that the fitting parts having the shape different from that of the other fitting parts are predeterminative periodically shifted in a circumferential direction.

14. The method for manufacturing the laminated iron core according to claim 13, comprising:

of forming a caulking hole in a region formed with the caulking block of a strip material forming the iron core piece located in a lowermost part and forming caulking projections in regions formed with the caulking blocks of the strip materials forming the second to uppermost iron core pieces;

of leaving the regions formed with the caulking blocks in the strip materials and forming the shaft hole;

forming a joining part, by which the caulking block is connected to the iron core piece, by push back processing and separably joining the caulking block to the iron core piece; and caulking and laminating the iron core pieces and placing the iron core pieces on the jig and pulling the caulking blocks to the radial inside and detaching the caulking blocks from the laminated iron core pieces.

15. A method for manufacturing a laminated iron core by laminating a plurality of iron core pieces having a predetermined shape to form a rotor iron core or a stator iron core, the method comprising:

providing a caulking block detachable along a radial direction formed in any one or both of a radial inside region and a radial outside region of each of the iron core pieces;
wherein the caulking block includes:
a caulking part projected from the iron core piece and formed with a caulking projection; and
a joining part engaged with a fitting part of the iron core piece, and
the caulking projection has a planar surface, wherein a first dimension of the planar surface extends in a circumferential direction and a second dimension of the planar surface extends in the radial direction, wherein the second dimension is longer than the first dimension, the method further comprising:
laminating and joining the iron core pieces through the caulking blocks; and
pulling the caulking blocks in the radial direction to detach the caulking blocks from the laminated iron core pieces.

16. The method for manufacturing the laminated iron core according to claim 15, wherein the caulking block includes a caulking part formed with a caulking projection, and a joining part engaged with a fitting part of the iron core piece, and
the joining part is fitted into the fitting part by push back processing by which the joining part is cut and bent or is half blanked and then is hit to be formed in a planar shape.

17. The method for manufacturing the laminated iron core according to claim 16, wherein the joining part has an isosceles trapezoidal shape narrowing in a pullout direction, and an angle of the oblique side is set at $\tan^{-1} 0.1$ or less.

18. The method for manufacturing the laminated iron core according to claim 16, wherein the joining part has an isosceles trapezoidal shape widening in a pullout direction, and an angle of the oblique side is set at $\tan^{-}2$ or less.

19. A laminated iron coreincluding a rotor iron core or a stator iron core in which a plurality of iron core pieces having apredetermined shape are laminated, the laminated iron core comprising:
a caulking block detachable along a radial direction formed in any one or both of a radial inside region and a radial outside region of each of the iron core pieces, wherein the caulking block includes:
a caulking part projected from the iron core piece and formed with a caulking projection; and
a joining part engaged with a fitting part of the iron core piece,
wherein a circumferentially extending outer surface of a flange portion of the joining part is aligned with a circumferential extending outer surface portion of the iron core piece in a circumferential direction of the iron core piece,
wherein outer shape lines of the iron core piece in both sides of the caulking block are joined to a final blanking outer shape line of the iron core piece so as to have steps therebetween, and
wherein the joining part includes shoulder parts having a width in a radial outside region of the joining part that is wider than a width of the caulking part in a radial inside region.

* * * * *

UNITED STATES PATENT AND TRADEMARK OFFICE
CERTIFICATE OF CORRECTION

PATENT NO. : 10,630,153 B2
APPLICATION NO. : 15/525662
DATED : April 21, 2020
INVENTOR(S) : Hasuo et al.

It is certified that error appears in the above-identified patent and that said Letters Patent is hereby corrected as shown below:

In the Claims

Column 22, Lines 59, 60 (Claim 8) change "by that the iron core pieces are correctly rotated and laminated by checking" to -- by checking --
Column 26, Line 6 (Claim 18) change "$tan^-2$" to -- $tan^{-1}2$ --
Column 26, Line 7 (Claim 19) change "coreincluding" to -- core including --
Column 26, Line 9 (Claim 19) change "apredetermined" to -- a predetermined --

Signed and Sealed this
Seventeenth Day of November, 2020

Andrei Iancu
*Director of the United States Patent and Trademark Office*